United States Patent [19]

Lyon

[11] Patent Number: 4,521,773
[45] Date of Patent: Jun. 4, 1985

[54] IMAGING ARRAY

[75] Inventor: Richard F. Lyon, Palo Alto, Calif.

[73] Assignee: Xerox Corporation, Stamford, Conn.

[21] Appl. No.: 296,947

[22] Filed: Aug. 28, 1981

[51] Int. Cl.³ .............................................. G09G 1/00
[52] U.S. Cl. ................................... 340/710; 340/794; 382/50; 382/68; 235/472; 365/49
[58] Field of Search ............... 350/3.70, 3.78; 365/49, 365/234, 235, 127, 215; 235/472; 340/710, 709, 707, 706, 794; 382/50, 68

[56] References Cited

U.S. PATENT DOCUMENTS

| | | | |
|---|---|---|---|
| 3,145,368 | 8/1964 | Hoover, Jr. | 340/794 |
| 3,201,751 | 8/1965 | Rabinow | 382/68 |
| 3,304,434 | 2/1967 | Koster | 250/231 |
| 3,473,036 | 10/1969 | Marcus | 250/219 |
| 3,496,364 | 2/1970 | Foskett et al. | 250/219 |
| 3,524,067 | 8/1970 | West | 250/219 |
| 3,541,521 | 11/1970 | Koster | 340/172.5 |
| 3,541,541 | 11/1970 | Engelbart | 340/324 |
| 3,701,095 | 10/1972 | Yamaguchi | 340/146.3 MA |
| 3,835,464 | 9/1974 | Rider | 340/324 A |
| 3,868,655 | 2/1975 | Filipazzi | 365/49 |
| 3,892,963 | 7/1975 | Hawley et al. | 250/231 R |
| 3,906,465 | 9/1975 | Moriwaki et al. | 350/3.78 |
| 3,949,235 | 4/1976 | Miyazaki et al. | 350/3.78 |
| 3,987,685 | 10/1976 | Opocensky | 74/471 R |
| 4,114,034 | 9/1978 | Hunka | 250/202 |
| 4,180,704 | 12/1979 | Pettit | 250/237 G |
| 4,260,979 | 4/1981 | Smith | 235/472 |
| 4,329,684 | 5/1982 | Monteath et al. | 340/794 |
| 4,364,035 | 12/1982 | Kirsch | 340/710 |
| 4,390,873 | 6/1983 | Kirsch | 340/710 |

FOREIGN PATENT DOCUMENTS 54-126426 10/1979 Japan ................................... 340/710

OTHER PUBLICATIONS

The Hologram Tablet-A New Graphic Input Device, Sakaguchi et al., 1970, Fall Joint Computer Conf., pp. 653–658.
C. Tassell et al.: "Photodiode Arrays–Characteristics and Applications" Microelectronics Journal, vol. 10, (1), pp. 35–44, (1979).
B. E. Bliss et al., "Ball–Joint Position Transducers" IBM Technical Disclosure Bulletin, vol. 13, (9), p. 2620, (Feb. 1981).

Primary Examiner—Marshall M. Curtis
Attorney, Agent, or Firm—W. Douglas Carothers, Jr.

[57] ABSTRACT

An imaging array provides a plurality of distinguishable bitmap images and comprises an array of sensor cells capable of sensing radiation. The cells are connected in a manner to form distinguishable bitmap images through a pattern of correspondence among the cells. Each bitmap image formed comprises a combination of one or more cells indicative of detecting an image pixel within a field of array cells that have been nonindicative of such detection. The pattern of correspondence may be one of inhibition of the operation of other cells in the array or one of indication of operation to other cells in the array. Various patterns of correspondence can be created among the cells creative of bitmap images. Bitmap images may consist of combinations of responsive cells within a field of nonresponsive cells in the array. For example, each bitmap image may comprise radiation responsive array cells that have sensed a sufficient quantity of radiation within a field of cells which have not sensed radiation or have been inhibited from sensing radiation. On the other hand, each bitmap image may comprise array cells that have not sensed a sufficient quantity of radiation within a field of cells that have sensed a sufficient quantity of radiation. An application of the imaging array is in an IC chip for a cursor control device or an "optical mouse" for use with an interactive display oriented computer system to provide movement for a visible cursor from position to position on a display screen of such a system.

63 Claims, 43 Drawing Figures

| INHIBITION NEIGHBORHOODS | INHIBITION RADIUS | STABLE IMAGES AND HOW MANY OF EACH | IMAGES |
|---|---|---|---|
|    | <1 | 1 | 1 |
|    | 1.1 | 2 8 8 8 2 <br> 2 4 4 4 | 42 |
|    | 1.5 | 8 8 8 8 4 <br> 4 8 4 8 4 <br> 2 1 4 8 | 79 |
|    | 2.1 | 2 1 8 8 <br> 4 8 4 8 | 43 |
|    | 2.3 | 4 1 8 4 4 4 | 25 |
|    | 2.9 | 4 4 1 8 4 | 21 |
|    | 3.0 | 4 4 2 8 8 4 | 30 |
|    | 3.1 | 4 4 2 8 8 | 26 |
|    | 3.2 | 4 2 8 | 14 |
|    | 3.7 | 4 2 8 | 14 |
|    | 4.3 | 4 4 8 | 16 |

FIG. 13

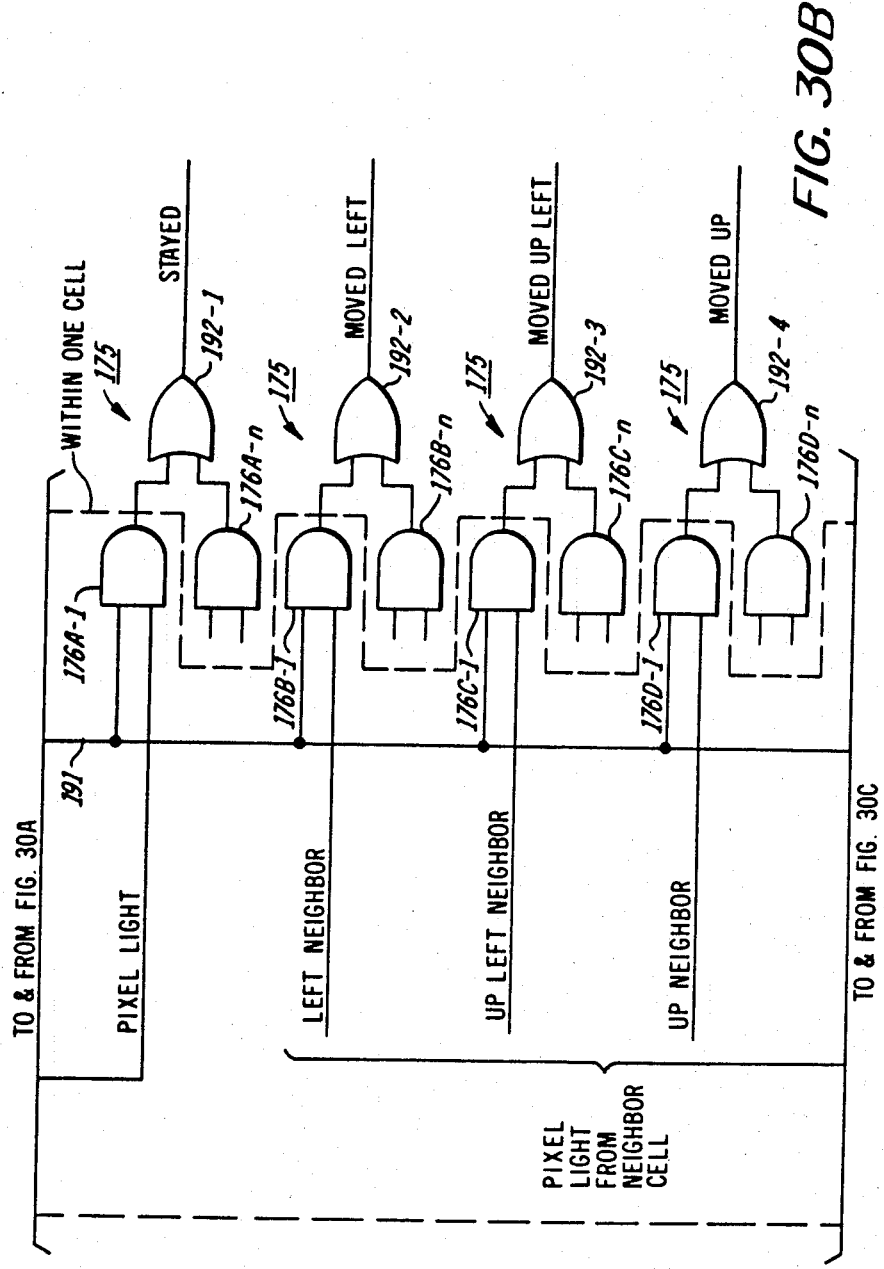

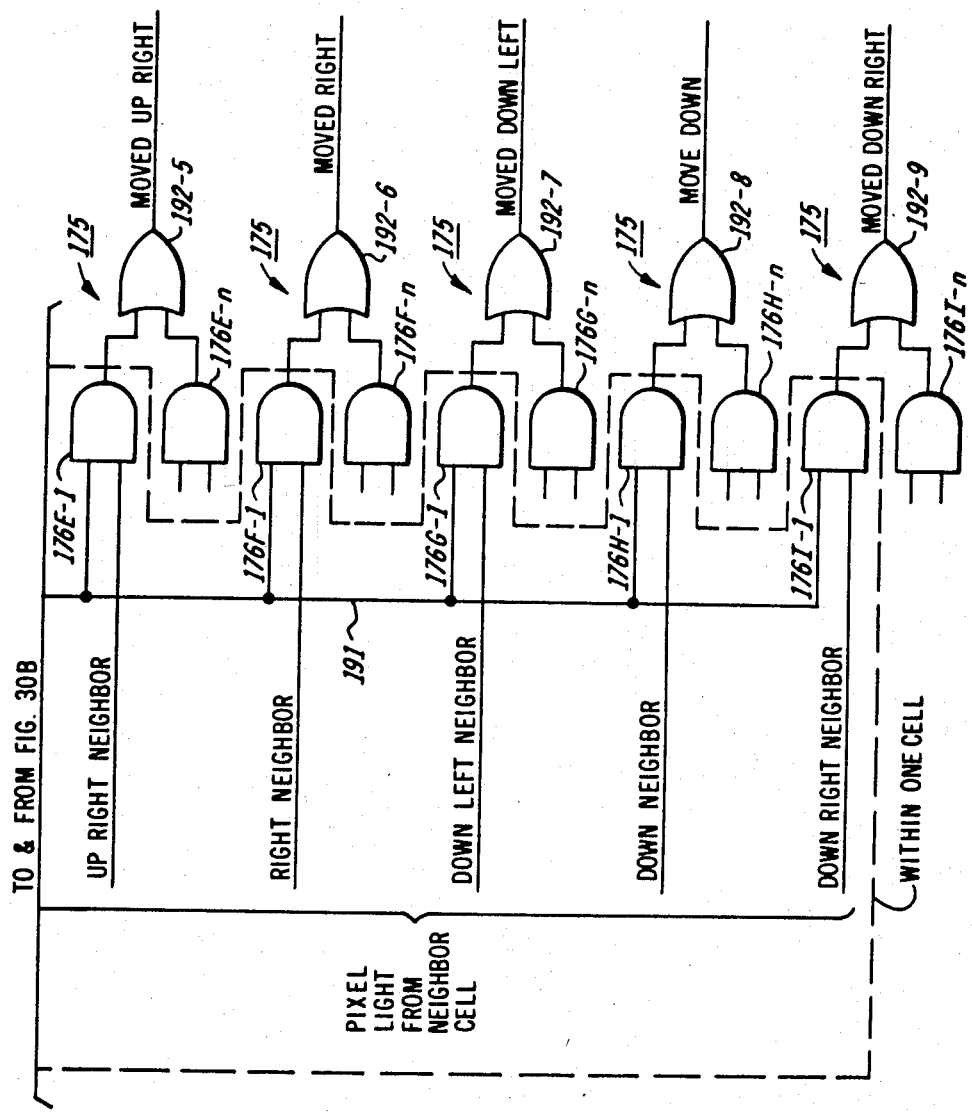

| INHIBITION RADIUS | ADDITIONAL "SUBSET" IMAGES SEEN BY DARK-SPOT SENSOR ARRAY | GRAND TOTAL |
|---|---|---|
| 2.1 | 4  4  8  4  4<br>8  8  4  2  8<br>8  8  8  4  4<br>8  4  4  1 | 146 |
| 2.3 | 4  4  8  4  4<br>8  8  4  2  1 | 72 |
| *2.9 | 4  8  8  8<br>4  4  2  1 | 60 |
| 3.0s | 4  8  1 | 43 |
| 3.1 | 4  8  1 | 39 |

*FIG. 36*

IMAGING ARRAY

BACKGROUND OF THE INVENTION

This invention relates to imaging arrays and in particular to imaging sensor arrays to perform bitmap functions in digital computing systems and in applications for such systems, such as cursor control devices.

Over the past decade or so, the functional control device for use, for example, with a computer display system has developed with the development of such systems. These devices have taken several forms, such as joy sticks, light pens, touch panels and hand held cursor control devices, now also referred to as a "mouse". One of the most prevalent uses of these devices is to alter the display at selected locations on a visual display of such systems by controlling a display cursor which is selectively moved over the display by means of the control device.

The mouse is a pointing device used with interactive display oriented computer systems, particularly to control the cursor on the system display. The mouse tracks the movement of a user's hand as the user moves the mouse about on a work surface or pad usually next to the user's keyboard input to the system. Microswitches may be positioned on the top surface of the housing of the mouse to perform various functions in the system upon finger operation of a switch selected by the user. The mouse device has recently become available in the office products market as a part of the 8010 Professional Workstation, developed, manufactured and distributed by Xerox Corporation.

Research over the period of time has led many to conclude that the mouse concept is the preferred and best means for performing cursor function controls, some of the reasons being its adaptability for use in conjunction with a keyboard input of such systems from a human engineering standpoint and ease of display cursor movement with desired functions implemented by microswitches present on the mouse. These cursor control devices or "mice" have been known of electromechanical design. Examples of such devices may be found in U.S. Pat. Nos. 3,304,434; 3,541,541; 3,835,464; 3,892,963 and 3,987,685.

The best known electromechanical and "grandfather" mouse was developed at Stanford Research Institute and is disclosed in U.S. Pat. No. 3,541,541. This mouse employs a pair of wheels that turn potentiometer shafts to encode X and Y motion into analog signals. Each wheel turns as the mouses is moved along its respective coordinate direction and slips sideways as the mouse is moved in an orthogonal direction. When the mouse is moved diagonally, both wheels turn and slip simultaneously. The design of this mouse led to the use of ball bearings as wheels and optical shaft encoders to generate a two bit quadrature signalling code, as disclosed in U.S. Pat. No. 3,892,963. The motion of a wheel caused a two bit output for a coordinate direction to form square waves in quadrature, with phase and frequency determined the direction and speed of travel. Each bit transition represented motion of one resolvable step which was employed to move the cursor on the display screen. Further development led to the employment of a ball or sphere instead of two wheels for more uniform tracking (U.S. Pat. Nos. 3,835,464 and 3,987,685). Internally, the sphere itself was a trackball with shafts turning against the ball and with commutation as shaft encoders or optical disc encoders, the latter being disclosed in U.S. Pat. No. 3,304,434.

While these mice have proved to be quite useful in performing display functions, they have not been outstandingly reliable, particularly over long periods of use. For example, the mechanical moving parts of the mouse, such as the balls and wheels become dirty and slip on the work surface or pad, rather than provide continuous rolling action, or the commutators become dirty and skip.

Also, because of the precision and tolerances necessary for the mechanical moving parts and the number of parts involved, these mechanical mice have been expensive to fabricate.

The goal, therefore, is to design a mouse with no moving parts (excluding the microswitches) thereby eliminating the above-mentioned mechanical disadvantages and providing a mouse with high reliability over long periods of time. One direction toward the goal of no moving parts is optics and optical detection of mouse tracking functions. The concept of optical tracking, i.e., optical detection of an optical image, such as a track, lines, bars or grating, is not new. Examples of such tracking utilizing one or more optical detectors are disclosed in U.S. Pat. Nos. 3,496,364; 3,524,067; 4,114,034 and 4,180,704. However, none of these optical tracking devices disclose optical tracking techniques suitable to perform the functions required in a mouse, i.e., they are not "smart" enough to provide multidirectional tracking indicative of direction of movement and the amount of the movement. What may be even more acceptable is an optical cursor control, i.e., an optical mouse that detects motion relative to the mouse body and independent of mouse rotation and independent of any inherent coordinate system employed with the mouse for tracking.

SUMMARY OF THE INVENTION

According to this invention, a novel imaging array is disclosed comprising a plurality of sensor cells capable of forming distinguishable bitmap images employing a mutual correspondence scheme relative to neighboring sensor cells. Further, the imaging array may be employed in a cursor control device to provide for cursor movement on a display screen in an interactive display oriented computer system.

The imaging array comprises an array of sensor cells capable of sensing radiation. The cells are connected in a manner to form distinguishable bitmap images through a pattern of correspondence among the cells. Each bitmap image formed comprises a combination of one or more cells indicative of detecting a image pixel within a field of array cells that have been nonindicative of such detection. The pattern of correspondence may be one of inhibtion of the operation of other cells in the array or one of indication of operation to other cells in the array.

In one form of the invention, circuit means, implemented in VLSI, e.g., NMOS integrated circuitry, is connected to each of the sensor cells to inhibit the response of at least one adjacent sensor cell in the array when an inhibiting cell has sensed a sufficient quantity of radiation, the pattern of inhibition among the sensor cells being creative of a multitude of bitmap images. Each bitmap image produced comprises responsive sensor cells in the array that have sensed radiation and non-responsive sensor cells in the array which either have not sensed radiation or have been inhibited from responding by one or more of the responsive sensor cells. Thus, the responsive cells create a bitmap image within the metes and bounds of the sensor array.

One way to create a bitmap image within the sensor cell array is to provide a contrasting pattern comprising a plurality of features on a contrasting background. The pattern is illuminated and the radiation is focused from the contrasting pattern onto the sensor array. The contrasting pattern may comprise a plurality of light features on a dark background or dark features on a light background. The features may be, for example, dots, spots or lines.

As employed in a cursor control device or optical mouse, the circuit means includes circuitry and a finite state machine comprising a programmed logic array responsive to changes in the bitmap images and capable of generating coordinate signals to a visual display device corresponding to changes in positional movement of the mouse relative to the contrasting pattern and, correspondingly, represent positional changes in the position of a visual cursor on a display screen of a display oriented computer system.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 13 is a detail of all the 30 possible patterns for the four by four imaging array having an inhibition radius of 3.0 .

FIGS. 30A, 30B and 30C are a logic diagram for a portion of the circuitry for a cursor control device comprising this invention.

FIG. 36 is an illustration of additional subsets of bitmap images possible for a four by four array and a contrasting pattern comprising dark features on light background based upon given inhibition radii.

DESCRIPTION OF THE PREFERRED EMBODIMENT

Figure 1:
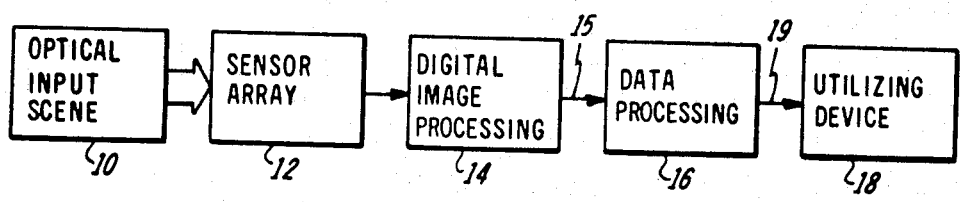
FIG. 1 is a block diagram of a system utilizing the imaging array of this the invention.

FIG. 1 represents a generic characterization of this description and may be referenced as a digital image system. The components of the system are represented by the components 10, 12, 14, 16 and 18 in FIG. 1. A field, scene or image 10 is present for detection. The optical scene is received by a detector array, digitized in a preferred manner, and processed to produce a desired signal output. The illuminated optical field or input scene 10 is detected by the analog image array 12, usually with the aid of focusing with an optical lens. The sensor array 12 is responsive to produce a bitmap image. This response undergoes digital image processing by means of logic circuitry, also termed, imager 14. At this point, the bitmap image is connected into an electrical representation of the originally sensed image. Further data processing at 16 produces desired interpretations of these patterns usually in the form of electrical signals that have meaning to and are interpreted by a utilizing device, user system or host 18.

In the framework of this disclosure, the various components 10, 12, 14, 16, 18 are related to the description and figures as follows.

Figure 2:
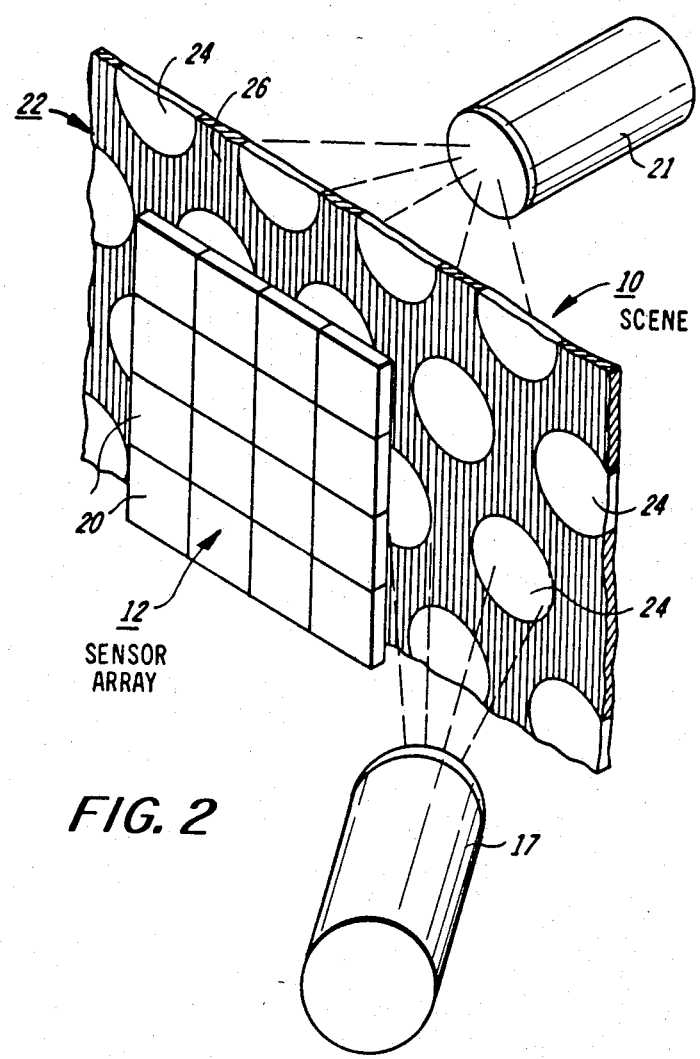
FIG. 2 is an enlarged perspective view to explain the relationship of a imaging array relative to a contrasting pattern employed in accordance with this invention.
Figure 14:
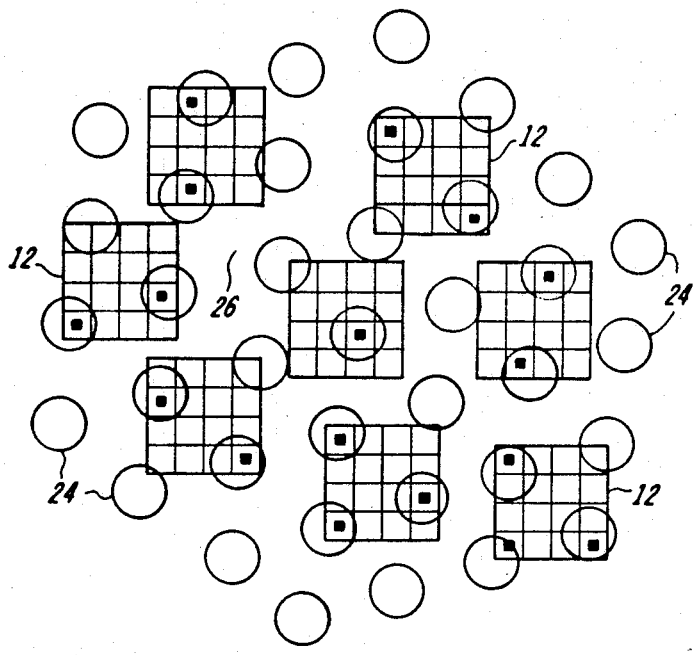
FIG. 14 illustrates various positions of a four by four imaging array relative to a hexagonal dot contrasting pattern showing examples of possible stable patterns for 3.0 inhibition radius.
Figure 20:
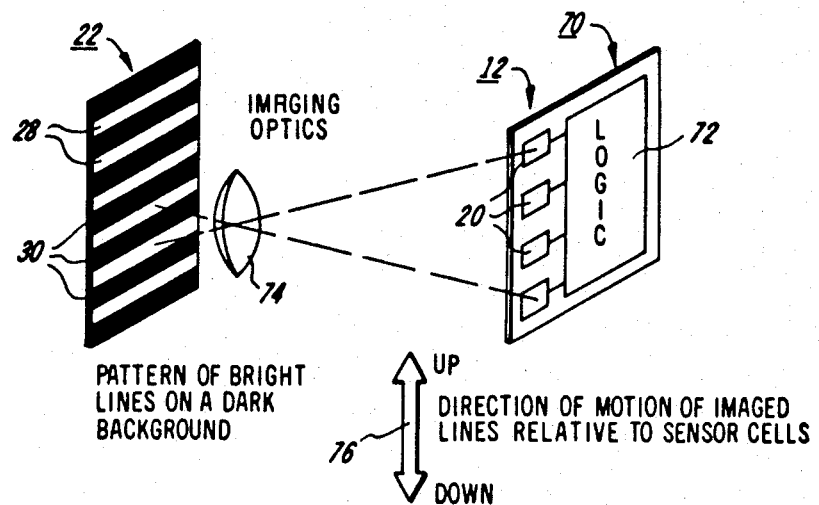
FIG. 20 diagramatically illustrates a linear motion detection scheme utilizing a contrasting pattern comprising light features on a dark background.

The optical input scene 10 comprising a contrasting pattern is best shown in FIGS. 2, 14 and 20. The contrasting pattern comprises a plurality of features on a contrasting background. The features may be light representations on a dark background or dark features on a light background. The features comprise geometric shapes, such as a plurality of dots, squares, lines, bars, etc.

The sensor array 12 may comprise a two dimensional array illustrated in FIG. 2 or a linear array illustrated in FIG. 20. Each array is made up of a group of sensor cells 20 having the logic attributes as disclosed in FIGS. 16 and 17.

Figure 18:
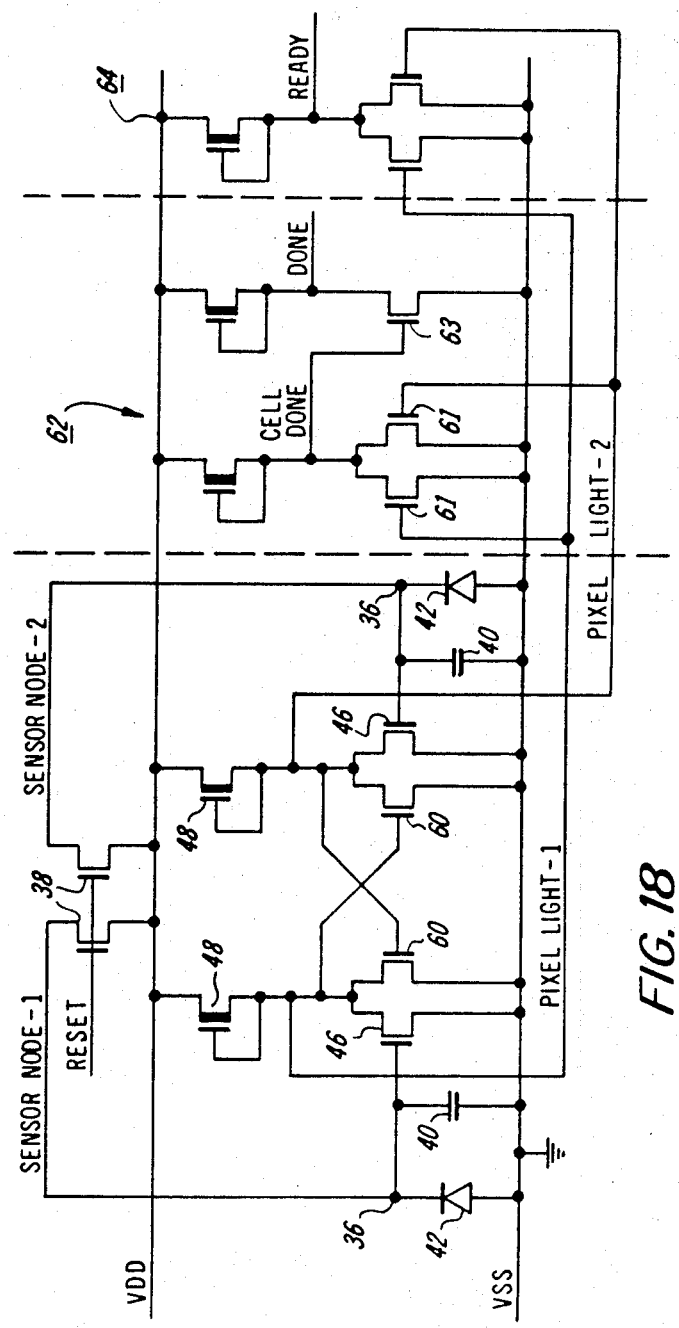
FIG. 18 is a circuit diagram for two connected imaging cells in a sensor array.
Figure 19:
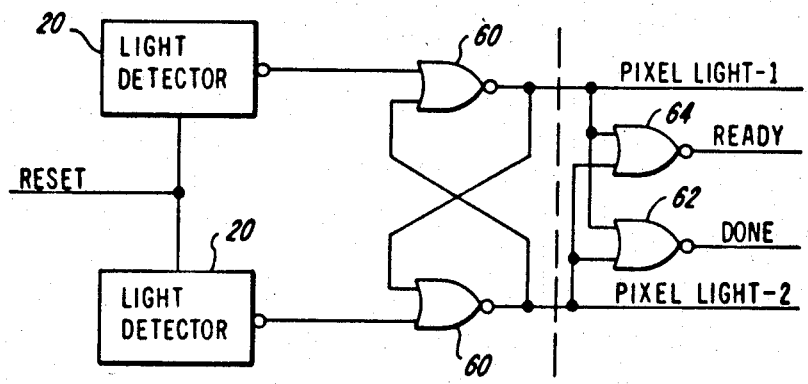
FIG. 19 is a simple logic diagram for the circuit shown in FIG. 18.
Figure 21A:
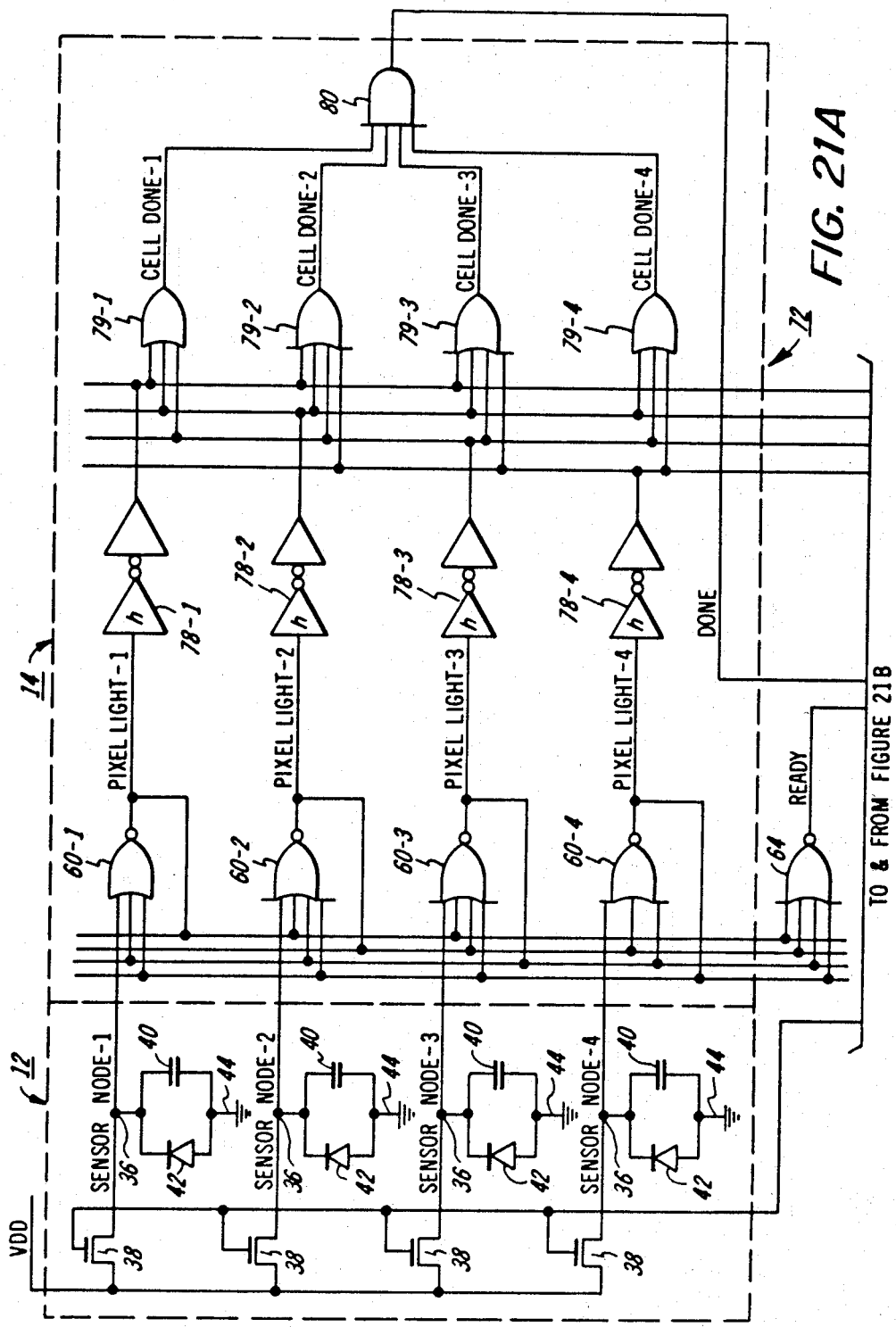
FIGS. 21A and 21B are a logic diagram for the operation of the detection scheme of FIG. 20.
Figure 21B:
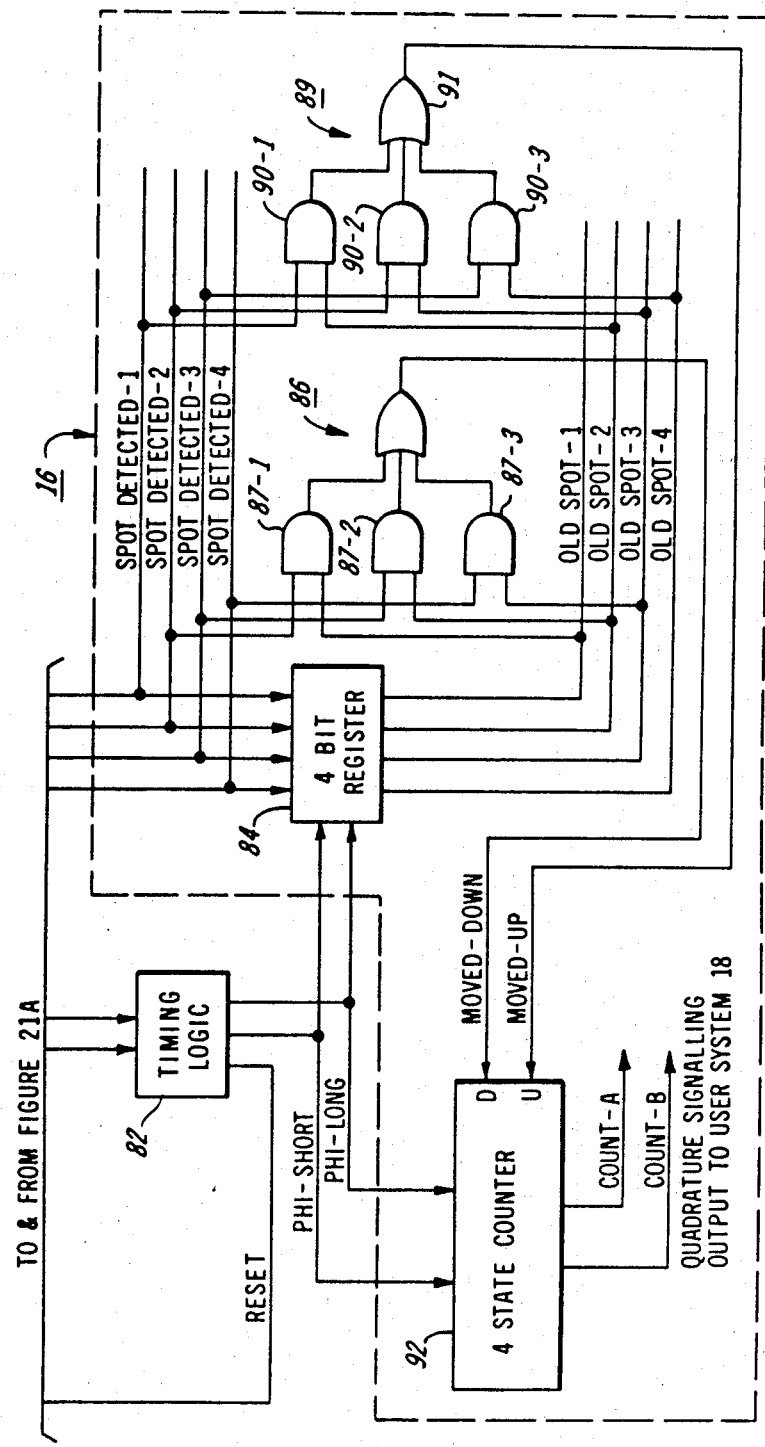

The digital image processing or imager 14 is best illustrated by the logic circuitry of FIGS. 18, 19 and 21. The output 15 of the imager 14 is representative of a bitmap, i.e., each sensor cell represents an independent picture element or pixel, which together form the array. A bitmap is produced in the array by some of the cells being responsive to the optical input scene 10 while others are not.

Figure 22:
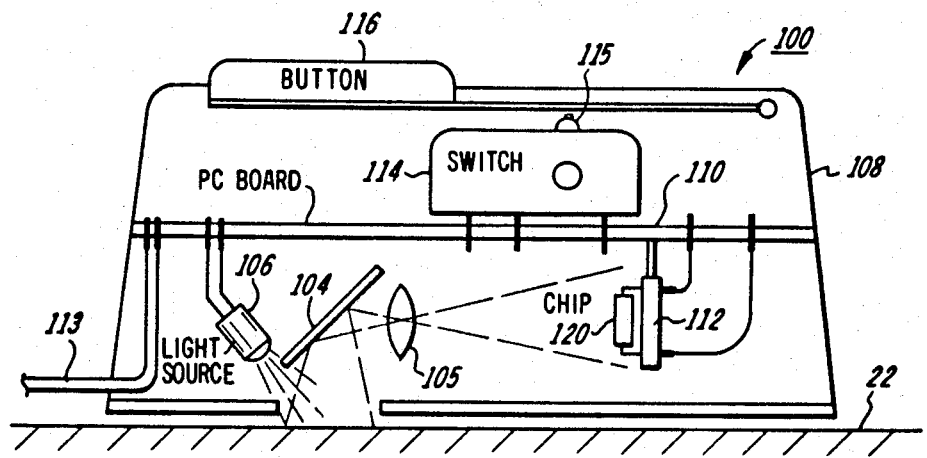
FIG. 22 is a diagramatic illustration of a cursor control device or optical mouse comprising this invention utilizing IC chip including the circuitry and logic illustrated in FIGS. 23 through 30.

Data processing 16 is best illustrated in FIG. 21 and FIGS. 26 through 33. The utilizing device for the purposes of exemplification of the invention comprises a cursor control device to provide movement for a visual cursor from position to position on the display screen of an interactive display oriented computer system. The cursor control device or optical mouse is illustrated in FIG. 22. The manner of operation of the sensor array 12 and imager 14 is a unique feature of this invention and a particular application of the sensor array is its employment as a cursor control device in conjunction with a visual display. The concepts of mutually inhibiting and/or self timed light imaging are not limited to cursor control devices. Other applications may be, for example, pattern or character recognition, optical alignment, edge detectors, light controlled oscillators, etc.

FIG. 2 illustrates one embodiment of components 10 and 12. The sensor array 12 comprises a two dimensional array of sensor cells 20, in this case being a four by four array. The scene 10 comprises a contrasting pattern 22 having features 24 on a contrasting background 26. The features 24 are larger in area than the sensor cells 20. The sensor array 12 is analogous to a fly's eye and "looks" at the pattern 22. Some of the cells will be responsive to light from the pattern 22, for example, radiation provided from source 17 and reflected from the features 24, these features being light features on a dark background.

Also, the light may be projected through the pattern 22 rather than reflected from the pattern. Radiation source 21 may be used in lieu of source 17 for this purpose. Under these conditions, the features 24 may be translucent or transparent while the background 26 is opaque.

The pattern 22 is depicted as planar but it should be realized that this pattern may be on a contoured surface. For example, pattern 22 may be on the exterior surface of a sphere with the sensor array 12 positioned centrally within or externally adjacent to the sphere surface with relative movement provided between the sphere and array for tracking.

An important feature of the invention is the manner of digital bitmap creation by the imager 14 and sensor array 12. The circuitry involved produces digital images snapshots of the contrasting pattern 22 employing self timed circuit techniques and mutually inhibiting sensor cells or neighbor cell inhibition. This concept is explained relative to FIGS. 3–5 for two dimensional arrays. A form of inhibition is implemented between sensor cells 20 in a manner that the output of some cells have reached a different logic state due to response to light detected while others are held to the original logic state either because they have been inhibited from detecting light by a nearby responsive cell or have not sensed a sufficient quantity of light. Once each cell has either detected light or has been inhibited by another responsive cell, the image is stable. All cells form a stable bitmap image until the digital logic is reset to commence the formation of a new snapshot. The digital imager 14 with its self timed logic can establish stable patterns, latch the patterns, reset and start over again at a rate roughly proportional to the quantity of light sensed and independent of the light level. Thus, a nice feature of the imager is that it is substantially light level independent.

Figures 3, 4, 5:
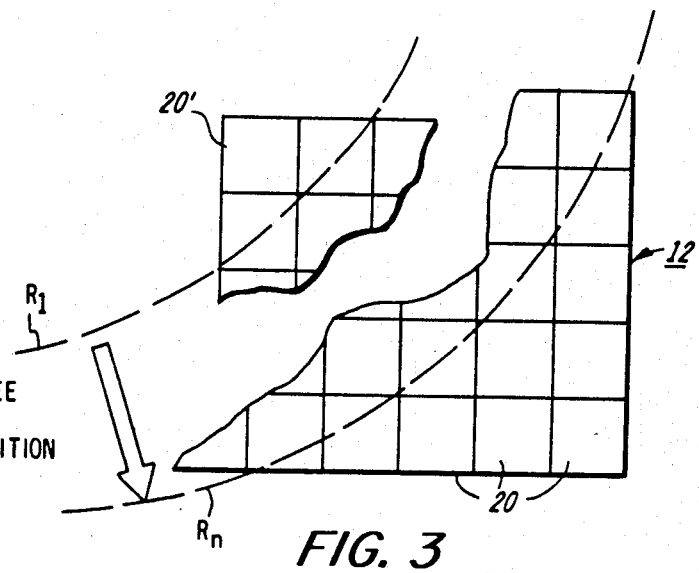
FIG. 3 is an enlarged plan view of a imaging array to explain the theory of sensor cell inhibition.
FIG. 4 is an example of neighbor inhibition in a three by three array.
FIG. 5 is an example of neighbor inhibition in a four by four array.

As will be explained in greater detail later, the number of possible bitmap images depends on the degree of neighbor inhibition. Also, the sensibility and practicality for pattern use depends, to some extent, on the degree of inhibition. In FIG. 3, the degree of inhibition is represented by various radial extensions, $R_1$ to $R_n$ from a sensor cell 20' that has been responsive to light. The greater the extent of inhibition means a decrease in the number of sensor cells 20 that will be responsive to light in any given image or snapshot.

Possible sets of stable output patterns due to neighbor inhibition is illustrated in FIGS. 4 and 5. In FIG. 4, a three by three sensor array is shown with the degree of inhibition being immediate neighbor cells. This represents the smallest degree of inhibition. This is represented by FIG. 4A where the "1" level represents a responsive cell in the array. The cells at the "0" level are, therefore, inhibited. This leaves the cells marked "x" in the array, which have the possibility of being either "1" or "0" prior to array reset. FIGS. 4B–4I represent all possible stable patterns for this particular degree of inhibition.

On the other end of the spectrum, the largest degree of inhibition would be that each sensor cell in the three by three sensor array of FIG. 4 is connected to every other sensor cell in the array so that upon the response of one cell in the array, every other cell is inhibited from response. In the three by three array, this provides the possibility of nine bitmap images.

By making the array larger, the number of possible patterns become larger. In FIG. 5, a four by four array is shown with the degree of inhibition being again immediate neighbor cells. This is represented by FIG. 5A where the "1" level represents a responsive cell in the array. The cells at the "0" level are, therefore, inhibited. This leaves the "x" marked cells with the possibility of being either "1" or "0". This results in the possibility of creating seventy-nine stable bitmap images, three of which are illustrated in FIGS. 5B-5D. This set of bitmap images has an interesting property of having a "1" level in each quadrant of the array.

Figure 6:
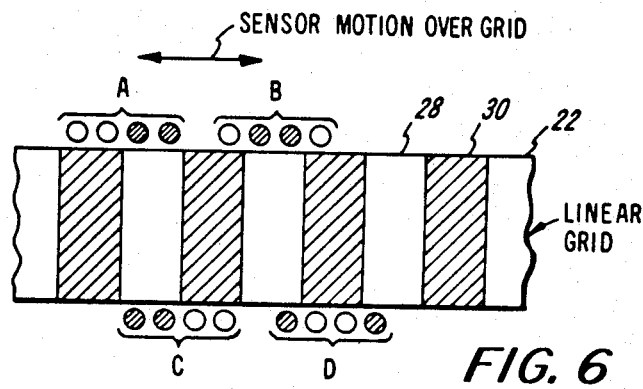
FIG. 6 is an enlarged view relating to neighbor inhibition scheme in a linear array.

FIGS. 6-11 illustrate linear arrays for linear tracking and employing a near neighbor inhibition concept. Assume a linear array of four sensor cells. Various positions of the array relative to a contrasting pattern 22 is represented by the four groups of dots, A, B, C and D in FIG. 6. The four sensors would be alternately coupled to form pairs so that one cell would not inhibit its immediate neighbor but rather the next succeeding cell. This alternate coupled pair of sensor cells is illustrated by the arrows in FIG. 7. With this scheme, four patterns are possible as illustrated by FIGS. 7A-7D. The arrows extend from responsive cells ("1" level) and indicate inhibition ("0" level) of alternate cells. The creation of inhibition using a contrasting pattern 22 is illustrated in FIG. 6. The pattern 22 consists of a linear grid comprising alternating light strips 28 and dark strips 30. Sensor cells that are responsive to light reflected from strips 28 are shown as dark spots in groups A-D. The patterns produced by groups A-D in FIG. 6 match with those of FIG. 7, the latter figure illustrating the alternate neighbor inhibition.

If the strip widths of the pattern 22 are equal to about twice the sensor spacing in the array, these patterns correspond in a readily determinable manner to positions of the strips relative to the sensors.

Figure 8:
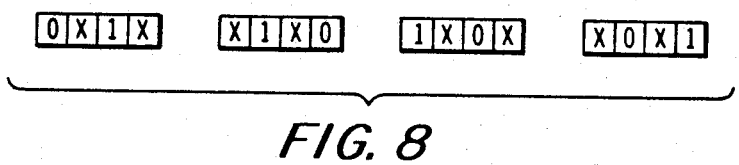
FIG 8 relates to the potential inhibition patterns for the neighbor inhibition of FIG. 7.

The possibilities in the development of any one of these patterns after one cell has been responsive is disclosed in FIG. 8. The possibilities are indicated by cells marked "x" where "x" will become either "0" or "1", depending on cell response.

Figure 7:
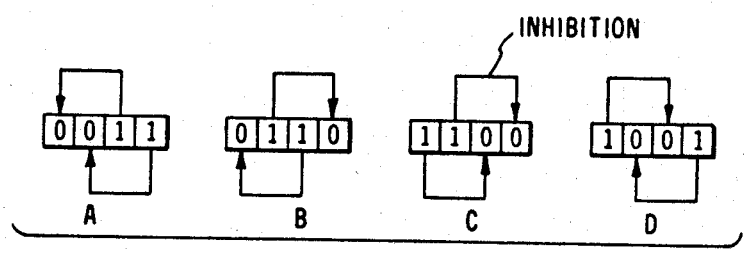
FIG. 7 is a plan view of linear patterns to explain the linear neighbor inhibition possible with the scheme of FIG. 6.
Figure 9:
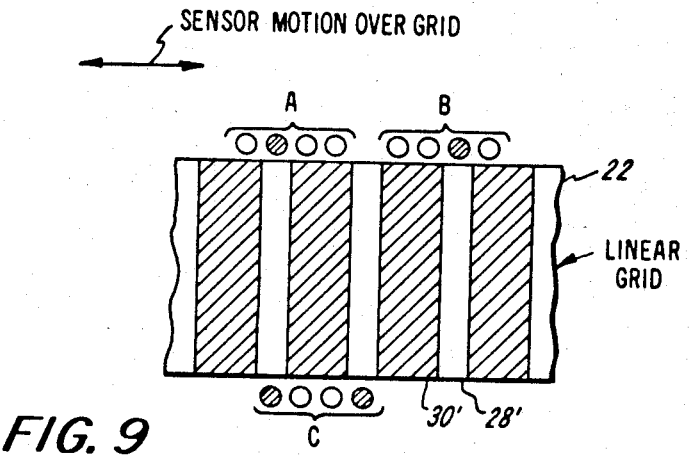
FIG. 9 is an enlarged view relating to modified neighbor scheme inhibition in a linear array.
Figure 10:
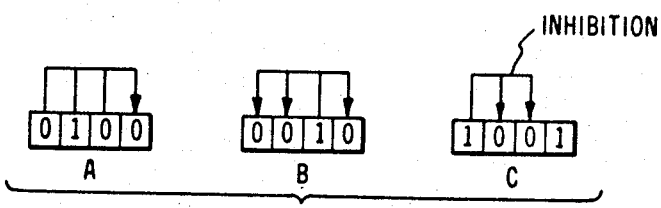
FIG. 10 is a plan view of linear pattern to explain the linear neighbor inhibition possible with the scheme of FIG. 9.
Figure 11:
FIG. 11 relates to the potential inhibition patterns for the neighbor inhibition of FIG. 10.

The case of the linear array of FIGS. 9-11 is different from FIGS. 6-8 in that the contrasting pattern 22 comprises light strips 28' and dark strips 30' having different strips widths. The light strips 28' are of narrower width than the dark strips 30' by about one-third. With the light strip spacing being about equal to about three sensor cell widths along the linear array, three stable patterns are possible with a neighbor inhibition the same as the previous case of FIGS. 6-8. The three patterns are shown in FIG. 10 with the neighbor and alternate neighbor inhibition illustrated by the arrows. The possibilities in the development of any one of these patterns after one cell has been responsive is disclosed in FIG. 11. The possibilities are indicated by cells marked "x", where "x" will become either "0" or "1", depending on cell response. As compared to FIG. 8, the possibilities have been narrowed due to the change in the widths of the light and dark strips 28' and 30'.

The alternate neighbor inhibition concept used in these linear arrays can also be readily applied to two dimensional arrays.

A simple digital finite state machine on the same semiconductor chip as the linear sensor array can be created for the purpose of comparing the current bitmap image with the previously bitmap image and produce output signals indicative of the positional functions, such as, "moved left", "moved right" or "stayed". Such an uniaxial or unidimensional motion sensor will be discussed in further detail in connection with FIGS. 20 and 21.

A greater challenge is presented for multidirectional sensing utilizing a two dimensional array which is tolerant of rotation of the sensor array relative to the contrasting pattern. Before proceeding with discussions relative to logic circuitry for the sensor array 12 and the imager 14 for linear or two dimensional arrays, further explanation of patterns of inhibition relative to two dimensional arrays should be first given.

Figure 12:
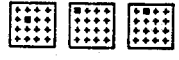
FIG. 12 is an illustration of the number of bitmap images possible for a four by four imaging array based upon the extent of inhibition radius.
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
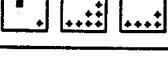
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
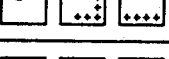
Figure 12:
Figure 12:
Figure 12:
Figure 12:
Figure 12:
Figure 12:
Figure 12:
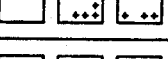
Figure 12:
Figure 12:
Figure 12:
Figure 12:
Figure 12:
Figure 12:
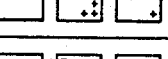
Figure 12:
Figure 12:
Figure 12:
Figure 12:
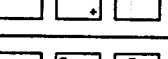
Figure 12:
Figure 12:
Figure 12:
Figure 12:
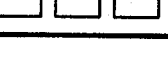
Figure 12:
Figure 12:
Figure 12:

FIG. 12 illustrates the total number of images possible for four by four sensor arrays for different radii of inhibition, measured in units. The number of stable bitmap images are pictorially illustrated followed by how many of those "types" of images are possible. The responsive sensor cells in the array are indicated as dark cells (∎). By "types" it is meant mirror images or rotations of images in the same array for a given image. "Inhibition neighborhoods" in FIG. 12 represents pictorially the extent or degree of inhibition. The dark cells (∎) represents the responsive cell, the inhibited cells are shown nonexistent as background, while cells that may still be responsive because they are outside the radius of inhibition of the responsive cell, are indicated by plus signs (+). According to the degree of inhibition, neighboring sensor cells in an array are coupled to sensor cells responsive to light and are inhibited from being responsive themselves, i.e., forced to stay at their original original binary level, i.e., "0".

Out of the different groups of images for given inhibition radii, one may select the group most suitable for a particular application. For applications relative to cursor devices, the image group having a radius of 3.0 is chosen for illustration. As indicated in FIG. 12, this group provides a set of 30 stable images, which are all illustrated in FIG. 13. These images comprise one or two responsive cells in the array per image. This particular inhibited sensor array may be employed in association with a contrasting pattern 22 comprising a hexagonal array of light or white dots 24 on a dark or black background 26 in the manner illustrated in FIG. 14, although the images represented in this Figure are not specifically intended to be necessarily representative of a portion of the 3.0 inhibition radius class or group of images. Preferably, the white dot spacing is slightly more than the inhibition radial distance. For example, in the 3.0 inhibition radius sensor array, the dot spacing in the contrasting pattern 22 may be about 3.2, which is about the average distance between responsive cells in images formed by such an array.

Figure 15:
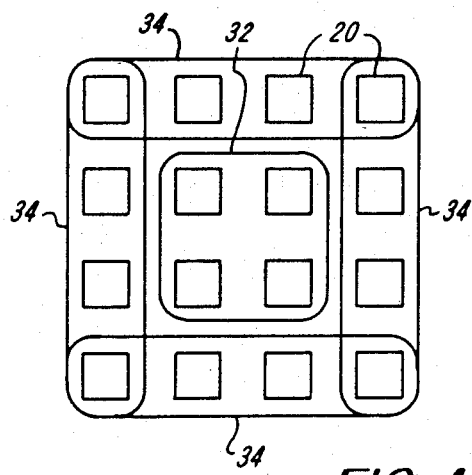
FIG. 15 illustrates another form of pattern characterization of the four by four imaging array having a 3.0 inhibition radius.

The sensor array with a 3.0 radius of inhibition and the rule of thumb dot spacing provides for a set of detectable images that make it simpler to translate them into image tracking. A unique characterization of these images is evident from an examination of the images in FIG. 13 with the aid of FIG. 15. The 30 images fall into two classes. The image is either a single responsive cell that falls in the central quad 32 of cells or it is a pair of responsive cells that fall in linear edge quads 34 on opposite sides of the array but never along the same edge of the array or sharing an edge of the array. In any case, there is always a feature or dot to track, as depicted in FIG. 14, upon movement of the sensor array 12 relative to the contrasting pattern 22.

Figure 16:
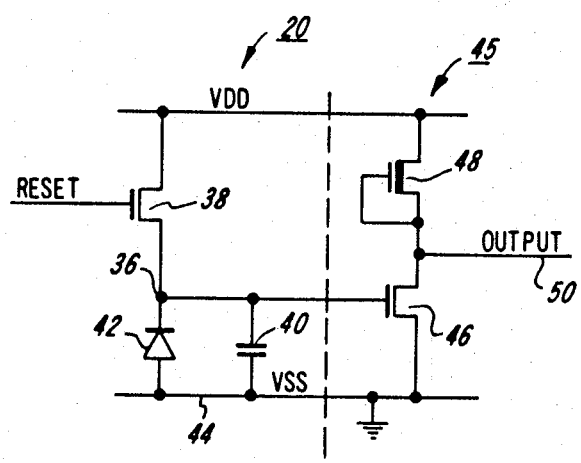
FIG. 16 is a circuit diagram for a single imaging cell in a sensor array.
Figure 17:
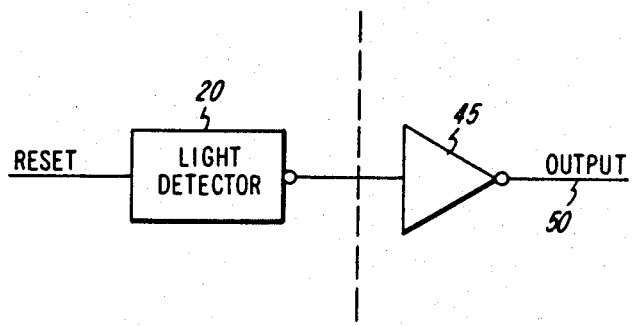
FIG. 17 is a simple logic diagram for the circuit shown in FIG. 16.

The simplest form of a cell 20 within an array 12 is shown in FIGS. 16 and 17 while the simplest form of a sensor array imager with mutual inhibition is illustrated in FIGS. 18 and 19. NMOS integrated circuit technology was used in the actual implementation of the invention but other integrated circuit technologies (PMOS, CMOS or bipolar) may be employed. In NMOS, when light strikes the circuit areas of the chip, photons are converted into hole-electron pairs with some reasonable quantum efficiency. The holes are attracted to the p-type silicon substrate, the most negative voltage region, while elecrons are attracted into n-type diffused regions, e.g., conductors, and channel regions, particularly those at higher potential.

Referring to FIG. 16, each sensor array cell 20 comprises a dynamic node 36. Node 36 is a circuit node which is isolated by low impedance transistor 38 and normally is capable of holding its voltage level for long periods of time due to its capacitance to ground 44. This capacitance is represented at 40. The photo-diode 42 represents the light detective properties and is connected to ground or a negative bias 44. When RESET is high or "1", transistor 38 is on and VDD charges the dynamic node 36. When RESET is low or "0", then transistor 38 is off and the charged node 36 is isolated from VDD. Light is detected by the cell 20 due to the sensitivity of photo-diode 42 causing it to collect negative charge. As a result, there is a decrease of voltage at node 36. The voltage at node 36 continues to decrease at the diode 42 continues to be responsive to the presence of light.

The declining voltage at node 36 may be monitored by employing an inverter circuit 45 represented by transistors 46 and 48 to sense the voltage of the node 36 and communicate it as an output 50. The operation of this inverter circuit is conventional and is disclosed and discussed in the book, "Introduction to VLSI systems" by Carver Mead and Lynn Conway and published by Addison-Wesley Publishing Company, Chapter 1, pages 5-10. The inverter provides the complement. For example, upon each RESET and charging of the dynamic node 36, the voltage output 50 will start low and then rise toward a higher voltage as the dynamic node 36 goes low due to the detection of light and depletion of positive charge across the diode 42.

FIG. 17 is schematic diagram of cell 20 which comprises a light detector reset by an input and coupled to an inverter to provide a high or "1" output when the detector output goes low or "0", until RESET.

The imager 14, therefore, may be characterized as an array of cell subcircuits each with a dynamic node capable of "watching" declining voltages and producing pixels, together forming partial bitmap images based upon inhibiting continued operation of other neighboring cell subcircuits. The simplest imager form is shown in FIG. 18. The intercell connection is only illustrated for two cells for purposes of simplicity. The schematic diagram for the circuitry of FIG. 18 as illustrated in FIG. 19.

The two cell imager 14 comprises cells 20, a done detect circuit 62 and a ready detect circuit 64. Each cell 20 has a NOR gate 60 (FIG. 19) at its output which has its output cross coupled as an input to the NOR gate 60 of the other cell. The outputs of the NOR gates 60 are connected to an OR gate 62 whose logic threshold is higher than normal. The outputs of NOR gates 60 are also connected to NOR gate 64 which has a lower threshold than normal. The two cell imager 14 compares the light level at two cell nodes 36 and provides an indication when it has made a decision. Either PIXEL LIGHT-1 or PIXEL LIGHT-2 output will be high when the output of OR gate 62 is high ("1"), meaning that the cells have completed their light sensing function and the signal DONE is high or "1".

OR gate 62 consists of a NOR gate comprising two transistors 61 and an inverter comprising pull down transistor 63. The output of the transistors 61 is the signal CELL DONE.

The symbol (*) on the NOR gate 64 means that this gate is low threshold NOR gate, i.e., the threshold of operation is below normal so that its output will not indicate true until both inputs to the gate are definitely low, which indicates that precharge of the sensor nodes 36 has been successfully accomplished. Thus, a READY signal that is high or "1" indicates that both PIXEL LIGHT-1 and PIXEL LIGHT-2 are low or "0", meaning that RESET has been accomplished. The symbol (#) on the OR gate 62 means that this gate is high threshold OR gate, i.e., its output is not true until either input is definitely high so as to insure that intermediate and metastable states have passed. Thus, a DONE signal indicates that either PIXEL LIGHT-1 or PIXEL LIGHT-2 has definitely gone high or "1".

Looking at the operation of the cross-coupled NOR gates 60 from a binary pattern point of view, the initial reset pattern of the NOR gates 60 is 00, since the outputs are low because the initially high dynamic nodes 36 are high or "1". The final pattern after intermediate and metastable state can only be either 01 or 10, since the NOR gate output pattern, 00, will decay with time and the pattern, 11, is not a possible output from the cross-coupled NOR gates.

The concept illustrated by the two cell imager 14 is the use of cross-coupled transistors to convert the image sensing inverters of the cells to NOR gates 60. Any pair of cells in the sensor array 20 may be chosen to be connected by these mutual inhibition sub-circuits 20. For example, each cell may be connected with its eight neighbor cells in a square grid, resulting in nine input NOR gates 60.

In any mutually inhibiting sensor array and imager, the cells 20 "race" to see who will finish first within an inhibiting neighborhood by obtaining enough light and then inhibiting outer cells in the neighborhood from being effective. This functioning is described in connection with a linear sensor array and logic disclosed in FIGS. 20 and 21. The linear array is initially chosen for illustration because it is simpler to understand as compared to a two dimensional array, which will be described later. However, the principle of operation is fundamentally the same.

In FIG. 20, the imager comprises the IC sensor chip 70 having a linear array of cells 20 coupled to circuit logic 72. Logic 72 for the most part is illustrated in FIG. 21. The chip 70 in combination with the contrasting pattern 22 of alternate light and dark strips 28 and 30 represents a complete digital image system from component 10 to component 16 in FIG. 1 to provide a signal output 19 to a user system 18. The pattern 22 in FIG. 20 is the scene 10. The sensor array 12 is represented by the linear array of cells 20. The circuit of FIG. 21 represents the cell array as well as both the imager 14 to the point output of AND gate 80 and signals DONE and SPOT DETECTED, and data processing 16 to the point of output of the 4-state counter 92 and the quadrature signals.

In FIG. 20, imaging optics 74 focuses the light image from pattern 22 onto the linear array 12. Relative movement between the contrasting pattern 22 and chip 70, indicated by arrow 76, will be productive of various linear bit patterns, which, upon sequential comparison, can be indicative of the positional functions, MOVED DOWN or MOVED UP. The absence of either of these signals means no motion detected or STAYED.

With reference to the schematic circuitry of FIG. 21, four binary logic variables are involved: SENSOR NODE, PIXEL LIGHT, SPOT DETECTED and CELL DONE. Starting the cycle of operation is accomplished by raising RESET to high, resetting SENSOR NODE equal to "1" which, in turn sets PIXEL LIGHT, SPOT DETECTED and CELL DONE to "0" in each cell 20. Once reset of the nodes 36 is accomplished, READY, the output of low threshold NOR gate 64, will go high and cause the timing logic 82 to set RESET low. At this point, array 12 is set to detect radiation received from pattern 22.

Upon operation of the sensor array 12 and logic 70, the following events occur. SENSOR NODE will slowly discharge from its reset high value from a 1 to 0 as light is detected by a responsive cell or cells. PIXEL LIGHT is the result of the low threshold NOR gate 60 function, the gate 60 having several inputs, one connected to the dynamic node 36 of its respective cell to receive SENSOR NODE and the other inputs being the cross coupled outputs from some of the other NOR gates 60 in the neighborhood. The number of inputs is dependent on the degree of inhibition. In the particular case here, the inhibition pattern is that of FIG. 11. The inhibition network among the outputs and inputs to NOR gates 60 is defined by choosing an inhibition neighborhood for each cell. Generally, neighborhoods are chosen to be symmetrical across the array, such that, since PIXEL LIGHT-1 inhibits NOR gate 60-2, then PIXEL LIGHT-2 will inhibit NOR gate 60-1. In many cases, the inhibition neighborhood of some cells may be all other cells in the sensory array.

The high or "1" produced at a NOR gate 60 output, PIXEL LIGHT, is connected to the input of the high threshold buffers 78 with their output designating a detected cell image, SPOT DETECTED. The output of the buffers 78 are connected as inputs to each of the OR gates 79-1 to 79-4. In order to signify that all detection functioning from each of the cells is complete, each of the four OR gates 62 must produce a done-detect signal CELL DONE. The CELL DONE signals from gates 79-2 and 79-3 are redundant and not necessary but may be just as well implemented for the convenience of circuit layout.

The inhibition NOR gate 60 output, PIXEL LIGHT, itself is not used for the final done-detection function. Rather a buffered version of that signal is used for the done-detection function, after passing a high threshold buffer 78 comprising a pair of inverters. This output signal is designated SPOT DETECTED and is indicative of the pixel condition of a cell. This is a simple way of preventing false done-detection during a metastable condition. The buffered signal is not used for inhibition, since that would make it participate in the metastable conditions, and because the extra delay included could cause oscillatory metastable states.

The outputs of each of the four OR gates 79-1 to 79-4 are connected as inputs to AND gate 80. AND gate 80 provides an output signal, DONE, to the timing logic 82.

Timing logic 82 provides two clock signals, PHI-SHORT and PHI-LONG. Details of the timing logic will be discussed later relative to FIG. 24. Timing logic 82 also provides the signal RESET, as previously indicated.

Low threshold NOR gate 64 has four inputs connected to receive all SENSOR NODE signals from the cells 20 and produces at its output the signal, READY, to timing logic 82, which is high or "1" when all of its inputs, the PIXEL LIGHT signals, are all set low or "0", meaning that all points SENSOR NODE are high.

The SPOT DETECTED signal outputs are also connected to a 4-bit parallel register 84. Register 84 is conventional and is shown in greater detail in FIG. 30. Also, more information relative to registers can be found in Chapter 3 of the book, "Introduction to VLSI Systems", supra. The output of register 84 always represents the previous bitmap image represented by signals, OLD SPOT, while the input to register 84 represents the just detected bitmap image represented by the signals, SPOT DETECTED. Register 84 performs the function of a latch. Operation of register 84 is accomplished by the clock signals PHI-SHORT and PHI-LONG. Clock PHI-LONG places the input into register 84 and clock PHI-SHORT places the input at the output of register 84. The clock signals PHI-SHORT and PHI-LONG are also connected to a 4-state counter 92.

The SPOT DETECTED and OLD SPOT signals are connected to down comparator 86 and up comparator 89. Comparator 86 comprises three AND gates 87 having inputs respectively connected to the signal lines SPOT DETECTED-2 and OLD SPOT-1; SPOT DETECTED-3 and OLD SPOT-2 and SPOT DETECTED-4 and OLD SPOT-3. The outputs of AND gates 87 are connected as inputs to OR gate 88. The output of OR gate 88 is a MOVED DOWN signal connected to the D input of counter 92. Comparator 89 comprises three AND gates 90 having inputs respectively connected to the signal lines SPOT DETECTED-1 and OLD SPOT-2; SPOT DETECTED-2 and OLD SPOT-3 and SPOT DETECTED-3 and OLD SPOT-4. The outputs of AND gates 90 are connected as inputs to OR gate 91, the output of which is a MOVED UP signal connected to the U input of counter 92. The absence of a signal on either input D and U during the appropriate clock cycle means STAYED.

The outputs of counter 92 are COUNT A and COUNT B and represent a quadrature signal output to a user system or device. Quadrature signalling relative to counter 92 is a state of the art technique and has been used with conventional electromechanical mice for many years. The 2 bit counter 92 is used to convert the MOVE UP and MOVE DOWN signals into quadrature signal representations convenient for asynchronous sampling by the user system 18 to which they are connected. The signal STAYED is, in essence, a NOR gate function when the outputs of OR gates 88 and 91 are low or "0", indicating no MOVE UP or MOVE DOWN.

It is a matter of design to provide desired feature spacing in contrasting patterns, the degree of array inhibition, the number of cells in an array, etc., depending on what is desired relative to a particular linear motion situation and intended solution. The bigger challenge comes with two dimensional detection and universal movement of the detecting array relative to a contrasting pattern. Such a challenge is an extension of the unidimensional tracking device disclosed in FIGS. 20 and 21 and will now be discussed.

FIG. 22 is a schematic side elevation of a cursor control device or optical mouse 100 comprising this invention. Structurally, the mouse 100 looks like conventional electromechanical mice. However, internal mechanical moving parts are replaced by the VLSI chip 102, mirror 104, lens 105 and light source 106. Housing 108 supports the PC board 110 upon which is mounted the structure 112 to support the chip 102. Chip includes the integrated circuitry for the sensor array 12, imaging processing 14 and data processing 16, including other appropriate circuitry, such as, timing circuitry. Quadrature signal output to the user system 18 is along cable 113. Function switches may be provided in the top of housing 108, each comprising a button 116 operative of a microswitch 114. Finger pressure on button 116 will depress stem 115 of microswitch 114. Microswitch 114 is supported on and electrically connected to PC board 110. The depression of button 116 will activate switch 114 and provide a signal to user system 18 to initiate a desired system function.

In use, the mouse 100 is moved over the work surface that includes the contrasting pattern 22. The light source 106 in mouse 100 illuminates a portion of pattern 22 as the mouse is moved over the surface of the pattern. The illuminated light features of the pattern 22 are focused by lens 105 on the surface of the IC chip 102 which includes sensor array 12.

Figure 23:
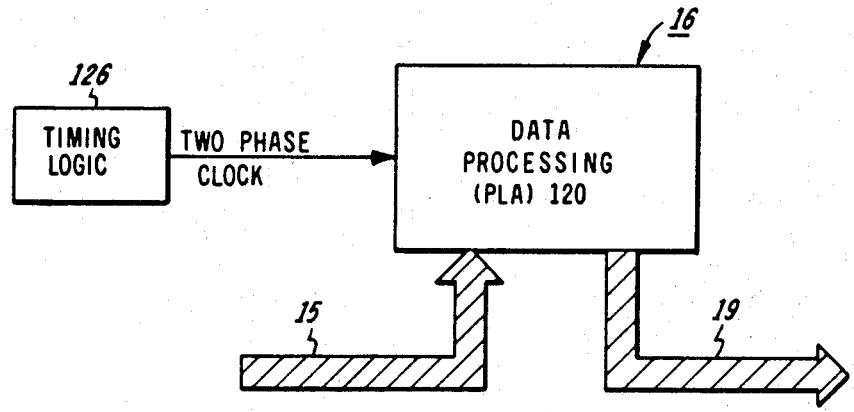
FIG. 23 is a block diagram illustrating a finite state machine having a programmed logic array to provide an output based upon a comparison between a present and previous bitmap produced by the digital imager.
Figure 24:
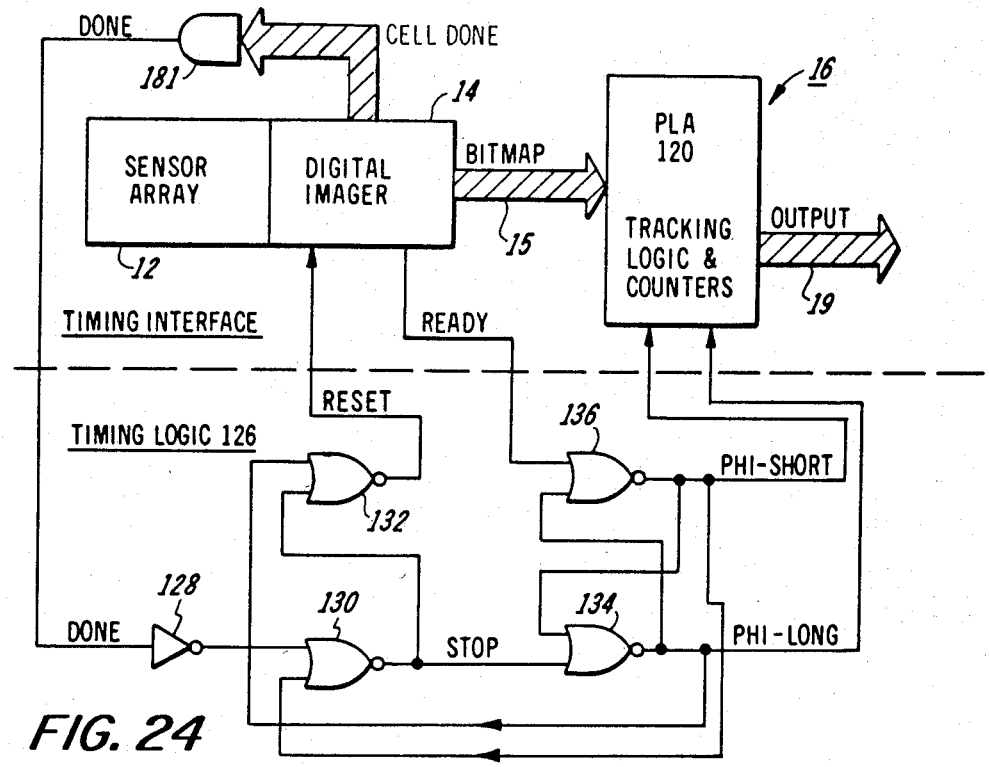
FIG. 24 is a logic diagram illustrating the timing logic and clock signals for the machine of FIG. 23.

The sensor array 12 and imager 14 having been discussed in detail, reference is now made to the data processing 16 and bitmap interpretation to provide a cursor tracking system useful for cursor control on display screens. This is accomplished by a finite state machine illustrated in FIG. 23. For discussion as to what is meant by a finite state machine, reference is again made to the book, "Introduction to VLSI Systems", supra, Chapter 3, pages 82–88. The data processing 16 comprises a programmed logic array (PLA) 120 which includes tracking logic and counters to provide an output indicative of the amount and direction of movement of the optical mouse 100 relative to a contrasting pattern 22. The PLA 120 is copuled to the timing logic 126 to provide two clock inputs, bitmap image input 15 from imager 14 and quadrature signal output 19 to the utilizing device 18, in this case an interactive display oriented computer system. FIG. 24 shows details of the timing logic 126, which provides two phase nonoverlapping clock signals, PHI-SHORT and PHI-LONG.

In general, the PLA receives a stable bitmap image along input 15 and compares this with its current state, which most likely is the previous image input and provides an output indicating the direction of movement of the mouse 100 relative to the pattern 22 based on the current state and new input. The output signal 19 represents a new state that can be understood by the user system 18 and indicative of relative motion of the imager/mouse.

The timing logic 82 and 126 are essentially the same. Logic 126 permits the PLA 120 to be self timed in performing the tracking function as well as control the tracking logic that generates two pairs of quadrature signals on output 19. The timing logic 126 generates the two phase clock signals to run the PLA 120 such that each cycle is synchronized to the reset-done cycle of the imager 14. The same clock signals run the counters controlled by the PLA to generate quadrature signals which can be converted to TTL compatible levels for communication off chip.

The timing logic 126 includes an input of a stable image from the imager 14 via AND gate 181 for the signal DONE to the input of the inverter 128. The output of inverter 128 is connected to NOR gate 130. The output of NOR gate 130 is cross-coupled to be an input of NOR gate 132. The output of NOR gate 130 is also connected as an input to NOR gate 134. The signal output from NOR gate 130 to inputs of NOR gates 132 and 134 is termed, STOP. The output of NOR gate 134 is the signal PHI-LONG and is an input to PLA 120 as well as being cross-coupled as an input to both NOR gates 132 and 136. The output of NOR gate 132 is the signal RESET and is connected to the reset terminal of the transistors 38 in the sensor array cell 20 in the imager 14.

The other input of NOR gate 136 is an output from imager 14, to wit, signal READY from the low threshold NOR gate 64 in the imager 14. The output of NOR gate 136 is the clock signal PHI-SHORT and is an input to PLA 120 as well as cross coupled as an input to both NOR gates 130 and 134.

The operation of the timing logic 126 relative to the imager 14 and the PLA 120 is explained with reference to the timing waveform diagram of FIG. 25. The clock signals are generated through a self-timed handshake with the imager 14. The digital logic of PLA 120 is sufficiently fast to keep up with the operation of the imager 14. The designation for the clock signals are chosen to indicate that PHI-LONG is of unbounded length compared to PHI-SHORT. The phase of PHI-LONG is during the "watching" period within which period bitmap images are formed. The phase of PHI-SHORT is during "cycling" period of the logic. PHI-LONG is also used as a quasi-static feedback to keep the PLA logic enabled and insensitive to any light on the chip surface while waiting for the report of results from the imager 14. The steps of operation of the timing logic 126 are as follows.

The operation starts with the initial scene sensing state just after RESET goes to "0". A high or "1" READY signal from imager 14 means that all PIXEL LIGHT signal outputs are at a low or "0". The DONE signal input at inverter 128 is at low or "0", meaning that there is presently no stable bitmap image. The output PHI-LONG at NOR gate 134 is high or "1" because, initially, it is at this binary level during the longer watching clock phase. Because of the cross coupling in the timing logic 126, this means that the output, PHI-SHORT, is low or "0". The output STOP at NOR gate 130 is low or "0" because a bitmap image is not yet complete, i.e. DONE is low or "0".

Figure 25:
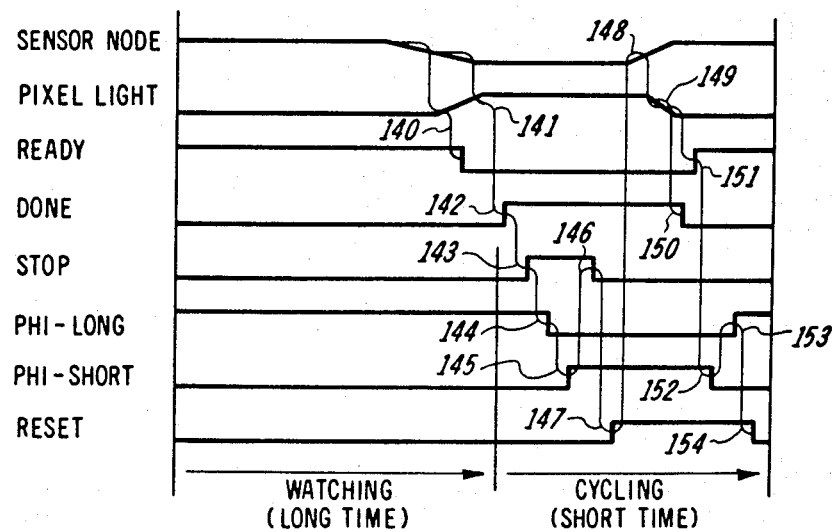
FIG. 25 is a timing diagram illustrating the operation of logic shown in FIG. 24.

Reference now should be made to FIG. 25 while following along in reference to FIGS. 16–19, 21 and 24. After some light has been received on the sensor array 12, some PIXEL LIGHT outputs will start to rise toward high or "1". Note in FIG. 25 the decrease in SENSOR NODE voltage value and an increase in PIXEL LIGHT voltage value. At some time before the bitmap picture and cell operation is complete, READY will go low or "0". The exact time is not important. This time is illustrated at 140 in FIG. 25. Note that the PIXEL LIGHT outputs are still rising.

When enough light has been received and detected, one or more SPOT DETECTED outputs will go high or "1". This is indicated at 141 in FIG. 25. The bitmap image has become stable pattern at this point in time. Next, a series of events will occur, leading to the short clock phase and cycling. Each cell reports CELL DONE to AND gate 181 and AND gate 181 reports DONE or "1" to inverter 128 (142-FIG. 25). The output of inverter is the complement, "0", to the input of NOR gate 130. The other input to gate 130, is already PHI-SHORT equal "0". As a result, the output, STOP, of gate 130 goes high or or "1" (143-FIG. 25). The inputs to NOR gate 134 being now at "0" and "1", (previously "0" and "0"), the output PHI-LONG, of gate 134 goes low or "0" (144-FIG. 25). With both PHI-LONG and READY at "0" the output of NOR gate 136 will go high or PHI-SHORT equal to "1" (145-FIG. 25).

With PHI-SHORT at 37 1", the inputs to NOR gate 130 are "0" and "1". The output, STOP, of gate 130 will now go low or "0" (146-FIG. 25). Since PHI-LONG is 37 0" and STOP is "0" (inputs to NOR gate 132), the output, RESET goes high or "1" (147-FIG. 25). RESET at high will turn on transistors 38 in the imager 14, permitting the charging of dynamic nodes 36 (148-FIG. 25), i.e., SENSOR NODE equal "1". Because of this, the pulldown transistors 46 will eventually turn on and pull PIXEL LIGHT to ground and the output PIXEL LIGHT will go low or "0" (149-FIG. 25). As a result, CELL DONE and DONE will go low or "0" (150-FIG. 25).

At about the same time, the output READY will go high or "1" since all outputs, SENSOR NODE equal "0" (151-FIG. 25), which is the functioning of NOR gate 64. At this time, READY input to NOR gate 136 will be high or "1" and the PHI-LONG input will be low or "0". As a result, the output, PHI-SHORT, of gate 136 will go low or "0" (152-FIG. 25). With both the outputs STOP and PHI-SHORT equal "0", gate 134 will go high or "1" (153-FIG. 25) and with STOP and PHI-LONG respectively at "0" and "1", the output RESET of gate 132 will go low or "0" (154-FIG. 25). Thus, the long and short clock phases of one cycle is completed with the value for initial state conditions being at the binary values as originally stated above.

Reference is now made to tracking aspects, i.e., the manner of interpretation of a positional move relative to a detected change from one bitmap image to the next.

Figure 13:
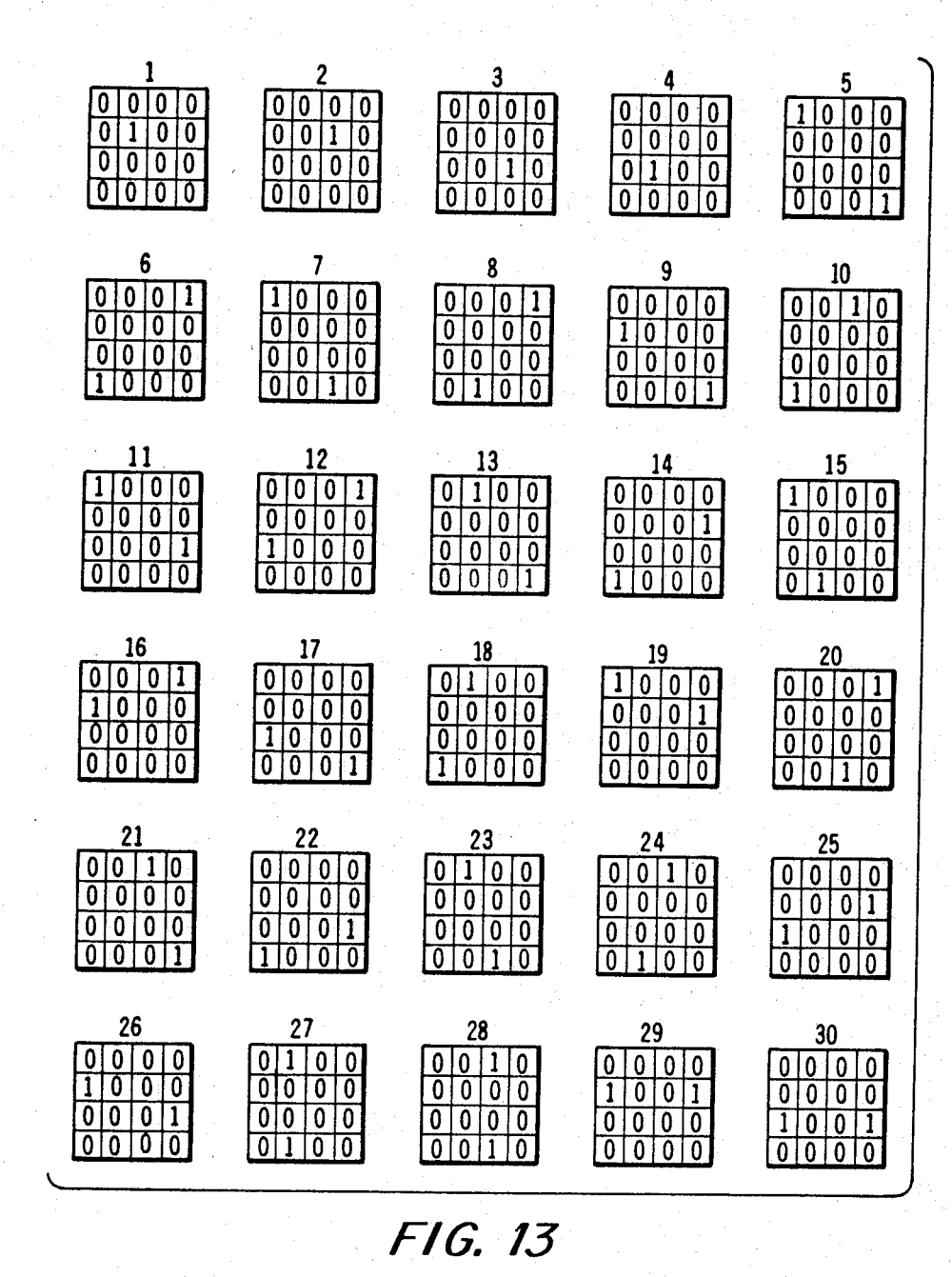
Figure 29A:
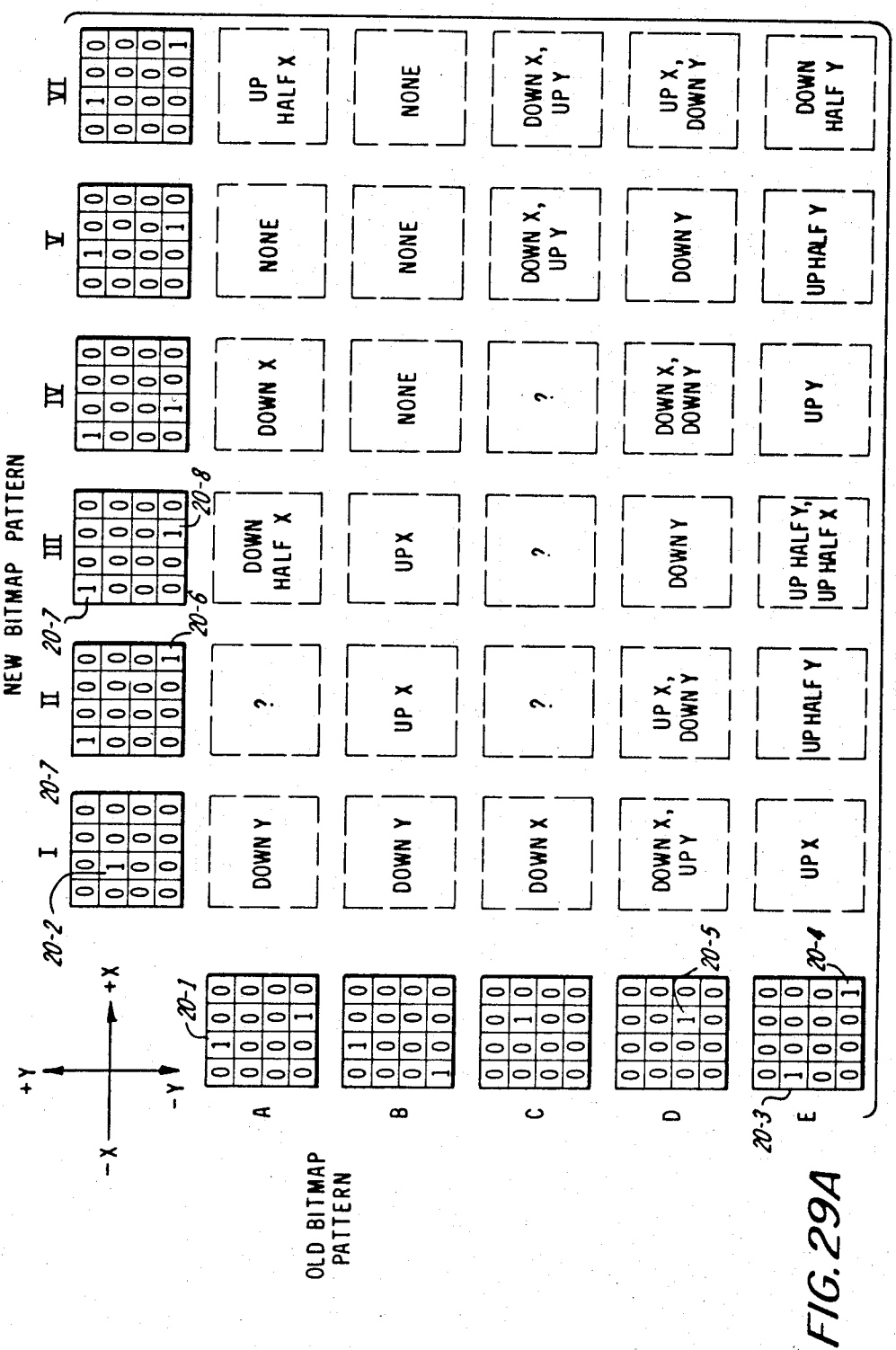
FIG. 29A illustrates a portion of an old-new bitmap matrix table for explaining tracking movements as interpreted by the logic circuitry of FIG. 27.
Figure 29B:
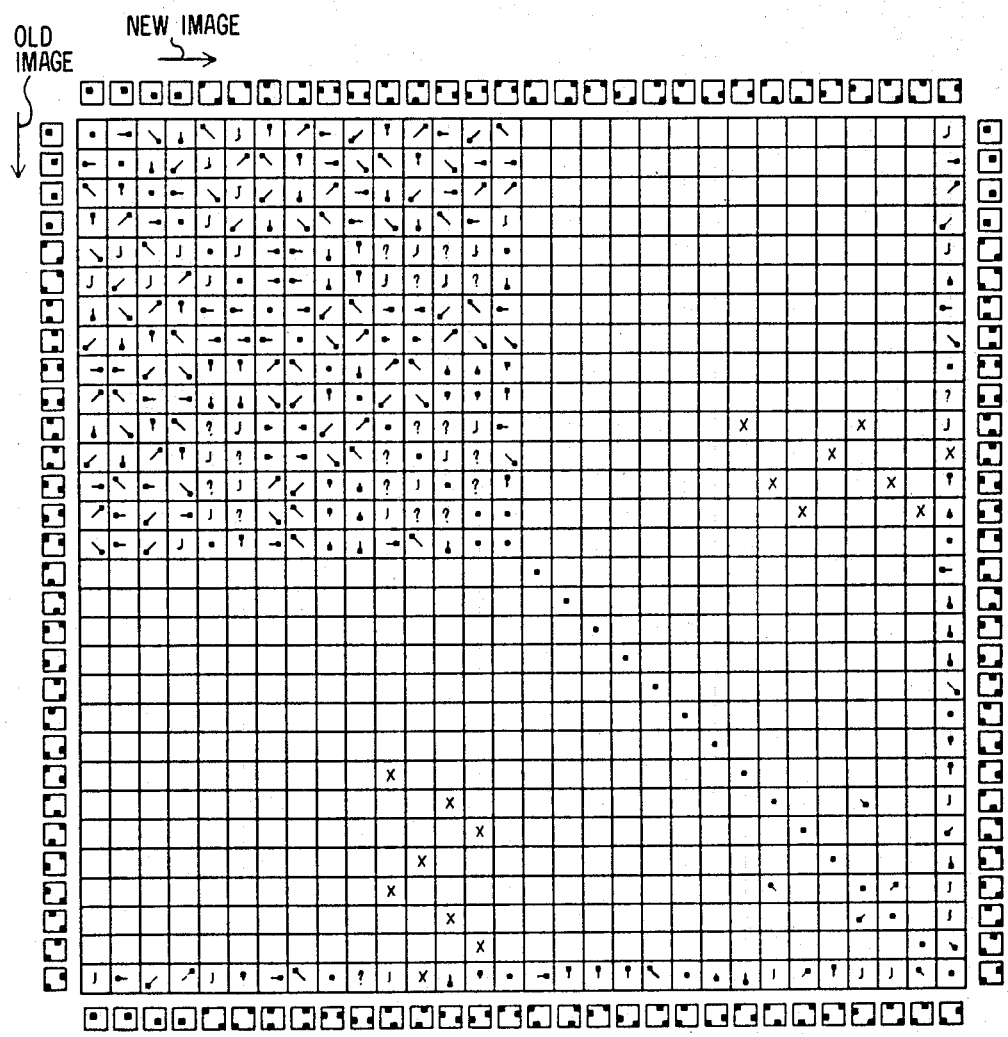
FIG. 29B is a partially filled in table and legends illustrating the moves necessary for tracking bitmap images with the optical mouse.

As previously indicated, for a two dimensional array, the degree of inhibition chosen was radius equal 3.0, providing 30 stable patterns as disclosed in FIG. 13. A matrix of these stable patterns can be formed so that 30 patterns may set up along a horizontal coordinate and the same 30 patterns set up along a vertical axis. One set may be termed, "old pattern" and the other set termed "new pattern". The resulting matrix will provide up to 900 possibilities of interpretation when translating from an old pattern to a new pattern. However, not all 900 possibilities are necessary for feature tracking with the optical mouse 100. A small portion of the matrix table is shown in FIG. 29A and will be referred to in the discussion below. FIG. 29B shows a partially filled in matrix table with all 900 possibilities represented. The legend at the bottom of the table is used to interpret the markings in the table.

The comparison functions of bitmap images can be performed in logic circuitry of data processing 16 for a two dimensional, four by four sensor array. The decision as to what happens relative to each cell 20 in the array 12 can be done locally. Each cell, for example, can save its old pixel value ("0" or "1") in a local register. During each cycle, a comparison is made between its new value and its old and also with the value of all its neighbors. Each cell reports out one of eleven possible results which can be characterized with reference to FIG. 28. Cell 20 can report, for example, that its previous pixel value of "1" has "moved" to one of its eight adjacent neighbor cells (up, up right, right, down right, down, down left, left or up left), or it stayed here, or it "vanished" (most likely because it became inhibited) or that it didn't have a pixel "1" to track in the first place. With all the cells reporting this information to the PLA 120, a logic desicion can be made as to what must be reported, while any contradictions must be filtered out.

Figure 28:
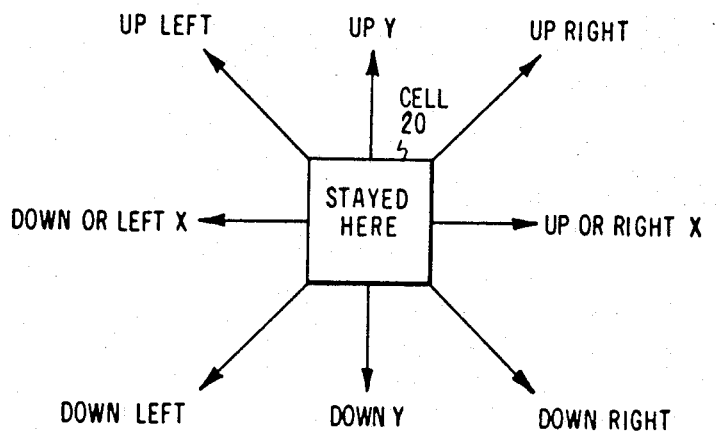
FIG. 28 illustrates all the possibilities for sensor cell change between a previous and present bitmap.

The eleven possibilities result in nine of them requiring conflict resolution, which are the eight neighbor moves and the no move (stayed here) of FIG. 28. The other two (no "1" present or no "1" to track) need not be reported. These nine inputs are identified as inputs to a tracker PLA 160, shown in FIG. 27. The purpose of PLA 160 is to produce counter control signals for X counter 162 and Y counter 164. PLA 160 has eight outputs relative to conflict resolution, three relating to X coordinate values of X UP, X HALF and X FULL, three relating to Y coordinate values of Y RIGHT, Y HALF and Y FULL, ANY GOOD and JUMP. ANY GOOD and JUMP are diganostic counter control signals and do not relate to the tracking scheme. The eight state X and Y counters 162 and 164 receive these outputs as inputs X RIGHT, X HALF and X FULL and Y RIGHT, Y HALF and Y FULL, respectively. Each of these counters provide a pair of output signals XA ans XB; YA and YB for the user system 18. Additional outputs XL and YL from these counters represent half cycle signals. In addition, all of these output signals, representative of current states, are fed back to the input of the counters 162 and 164.

A portion of the old-new bitmap image comparison matrix is shown in FIG. 29A. The embodiments shown clearly demonstrate the manner of determining the positional functions of FIG. 28. For example, if the previous image is "old" pattern A in FIG. 29A and the next pattern is "new" pattern I, the final report would be that the Pixel "1" in cell 20-1 in "old" pattern A moved to a neighbor below, i.e., cell 20-2, as shown in "new" pattern I. This is interpreted by PLA 120 as DOWN Y. Another comparison is "old" pattern E to "new" pattern I. Note that the pixel "1" of cell 20-3 in "old" pattern E has moved to cell position 20-2 in "new" pattern I. Note further that the pixel "1" in cell 20-4 of "old" pattern E has "moved off" of the array. Thus, the resulting interpretation is a move in the positive X direction or UP X. Again, a change from "old" pattern D to "new" pattern II shows that pixel "1" in cell 20-5 in the older image has ended up at cell 20-6 in the new image. Also, a new pixel "1" has appeared within the framework of the array at cell 20-7 in the new image. Thus, these differences can be logically determined as a step movement in both the plus X and minus Y directions or UP X, DOWN Y.

Figure 26:
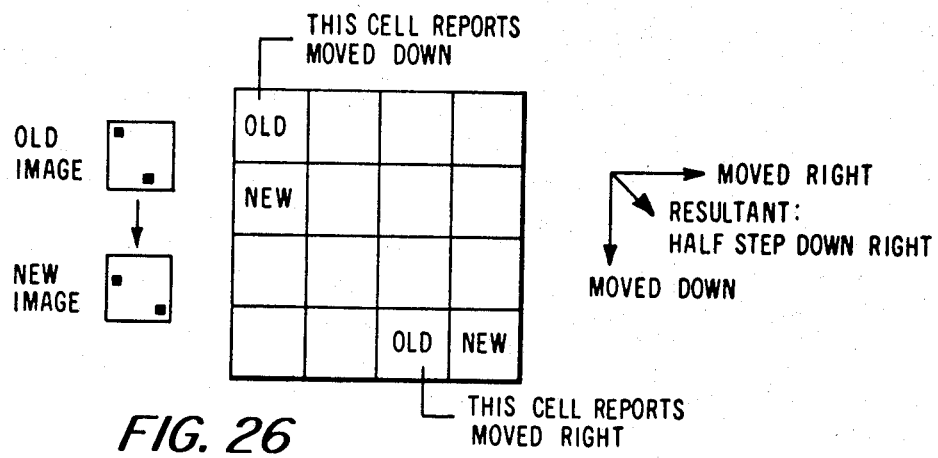
FIG. 26 is an illustration of tracking relative to a contrasting background by comparing old and new bitmap images.
Figure 27:
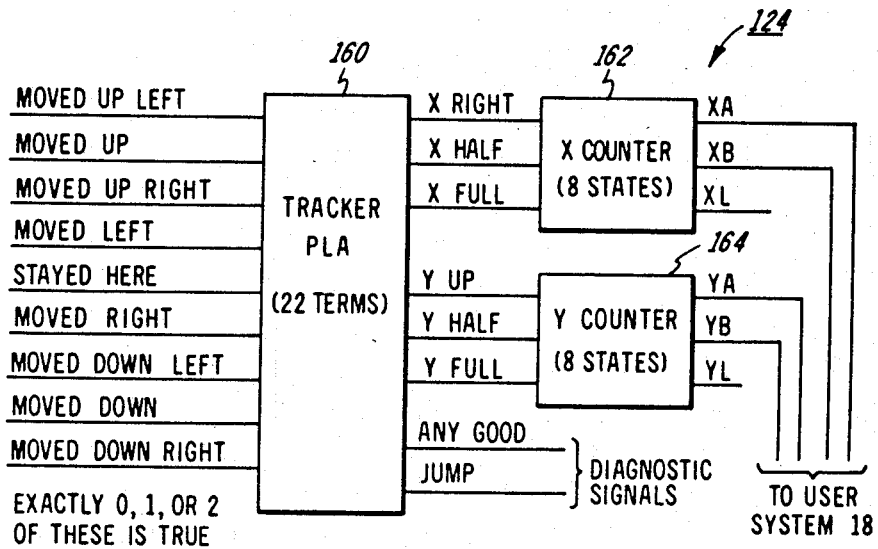
FIG. 27 is a logic diagram for the tracker PLA and counters specifically for implementing cursor control using the finite state machine of FIG. 23.

The old-new matrix table may be also used to determine half steps. An example of this is shown in FIG. 26. Note that in the comparison between old and new bitmap images that there are two "1" pixels involved. The old image can be identified as pattern number 23 in FIG. 13 and the new pattern can be identified as pattern number 9. One pixel has moved down one cell position in the array and the other pixel has moved right one cell position in the array. The two pixel moves, MOVED DOWN and MOVED RIGHT, are interpreted as a half step DOWN RIGHT.

As a further example of half steps, reference is again made to FIG. 29A. Note the comparison of "old" pattern E with "new" pattern III. The pixel "1" in cell 20-3 has moved up to cell 20-7 and the pixel "1" in cell 20-4 has moved left to cell 20-8. The two pixel moves, MOVED UP and MOVED LEFT, are interpreted as UP HALF Y and UP HALF X or a half step UP LEFT.

The question marks (?) in the matrix of FIGS. 29A and 29B indicate no logical correlation between patterns relative to tracking the changes in the positions of pixels "1" in the array from one such pattern to another. The Jumps (J) are pixel movements from one position to another extraneous cell position in the array. They are all treated as contradictions.

As illustrated by the matrix table of pattern tracking in FIG. 29B, the pattern matching scheme can be extended to the number of interpretations necessary for tracking the features in the contracting pattern. For the four by four array and an inhibition radius of 3.0, thirty pattern matches is all that it is necessary for the matrix and the positional functions identified in FIG. 28 out of a possibility of 900 such matches (30×30 patterns).

While the particular tracking scheme is demonstrated by FIG. 29B for actual tracking of features in a contrasting pattern that is characterized by tracking a feature with the sensor array and logically determining which direction the feature has moved relative to the array, it should be readily understood that pattern comparison logic can be designed for any conceivable old-new pattern matrix table. For example, comparisons need not be based on tracking pixels from one cell to an immediately adjacent or diagonal cell. Tracking could be based upon pixels jumping to predetermined cells in the array and indicative of some function to be performed. An example of this would be an image recognition scheme indicative of some functional message to the user system.

Figure 30A:
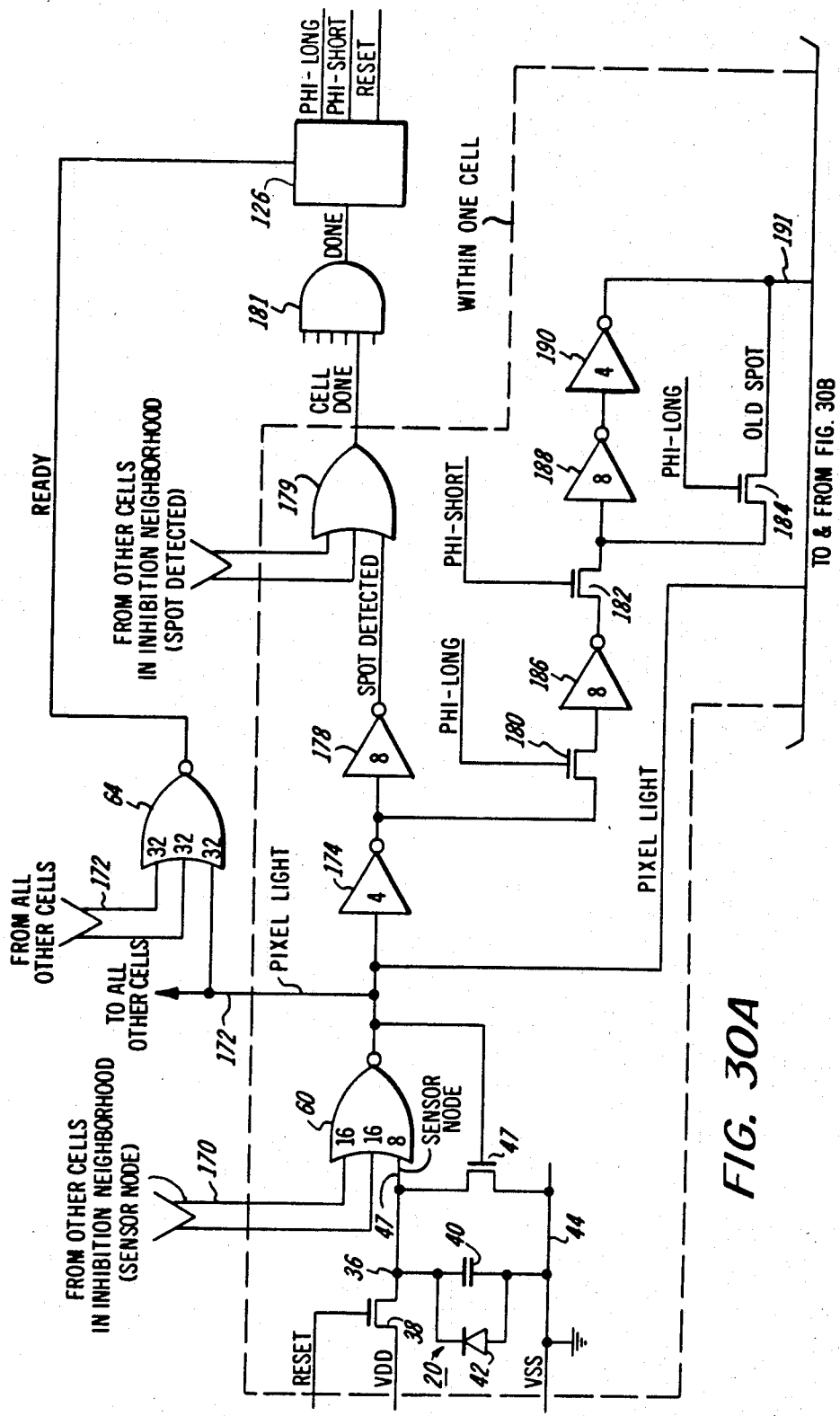

A specific example of the stable pattern detect logic for a two dimensional array is shown in FIGS. 30A-C. In order to simplify the explanation and understanding of this logic, the logic circuitry is shown only for one cell, this logic being identical for each of the other 15 cells in the array. The logic circuitry is also shown connected to the sensor array cell 20 and imager 14, previously discussed. Cell 20 is the same except for high impedance transistor 47 connected between node 36 and ground 44 and having its gate connected to the output of NOR gate 60. Transistor 47 is optional. Its function is to acclerate the decision making of the cell by discharging the dynamic node 36 to ground.

The reporting function for any particular cell relative to other cells in the array would be the 9 characterizations shown in FIG. 28. The logic cirucitry shown has many of the attributes of the circuitry shown in FIGS. 19 and 21 but is more complex due to the presence of a two dimensional array.

As shown in FIG. 30, the NOR gate 60 will have several cross-coupled inputs from the same NOR gates of other cells 20 in the array 12. The number of such inputs 170 to NOR gate 60 is dependent on the degree of inhibition chosen. Thus, these inputs are PIXEL LIGHT from NOR gates 60 from other cells in the inhibition neighborhood. By the same token, the PIXEL LIGHT output of NOR gate 60 for cell shown in FIG. 30 is connected to other cells in the inhibition neighboorhood. The PIXEL LIGHT of all array cell NOR gates 60 are connected as inputs 172 to NOR gate 64, the output of which is the READY signal to the timing logic 126.

The output 172 of NOR gate 60 is PIXEL LIGHT and is an input to inverter 174 and an AND gate 176A-1, which is one gate of a logic gate pack termed AND-OR (AO) gate 175. The inverted output from inverter 174 is connected to the input of inverter 178 which provides an inverted output SPOT DETECTED. These inverters act as a buffer. The signal level of SPOT DETECTED is the same as that at the output of NOR gate 60. The SPOT DETECTED output is an input to OR gate 179, which also has inputs from other cells in the inhibition neighboorhood. Gate 179 is functionally the same as a gate 79 in FIG. 21. The output of gate 179 is CELL DONE and one of the several inputs to AND gate 181, the output of which is signal DONE to the timing logic 126. Gate 181 is functionally the same as gate 80 in FIG. 21.

PIXEL LIGHT is the immediate pixel image result of the cell while OLD SPOT is the previous done-detect result of the cell. PIXEL LIGHT is always present as an input to AND gates 176A-1 to 176I-1 of AO gates 175. AO gates 175 comprise groups of AND gates 176A-I, nine gates in each group, with the outputs of the nine AND gates of each group connected as inputs to a respective OR gate 192-1 to 192-9.

OLD SPOT is the other input on line 191 to each of the AND gates 176A-1 to 176I-1. OLD SPOT is an output of a bit register comprising pass transistors 180, 182 and 184 and inverters 186, 188 and 190. This bit register logic is the same as that for the four bit register 84 in FIG. 21. The register is, in essence, an master or input latch coupled to a slave or output latch. PHI-LONG operates the input latch while PHI-SHORT operates the output latch. When PHI-LONG is high, the output lach remembers its old input and the input latch is transparent. When PHI-LONG is low and PHI-SHORT is high, then the value at the input latch is transferred to the output latch.

From an examination of this circuitry and the timing diagram of FIG. 25, it can be seen that a "present" pixel, i.e., PIXEL LIGHT, is presented as an input to inverter 186 during the watching portion of the cycle, PHI-LONG placing transistor 180 in its "on" state. However, when PHI-LONG goes low at time 144, PHI-SHORT goes high at time 145, transistor 182 is on and inputs to inverter 188. The double inversion PIXEL LIGHT provided by inverter 188 and 190 acts as a quasi-static half register or output latch with an output on line 191 that will represent OLD SPOT during the next cycle in the watching phase of PHI-LONG and the establishment of a new PIXEL LIGHT.

The output of each AND gate 176 represents the condition of each of the nine characterizations in FIG. 28 relative to the particular cell 20 under examination. The output of the OR gates 192 represents the characterations of FIG. 28 relative to all cells in the array.

Each of the group of AND gates 176A-n to 176H-n receives the signal PIXEL LIGHT from a designated neighbor cell, as indicated in FIG. 30. The other AND gates 176A-n, 176B-n, 176C-n, etc. in each group are inputs from other cells in the array involving the same functional tasks as identified at the inputs to these AND gates, i.e., they are pairs of inputs from other cells 20 in the array 12 representing the particular positional function between neighboring cells, being part of other cell circuitry. These gates are indicated as being outside the dotted boundary of cell 20 of FIG. 30.

Figure 31A:
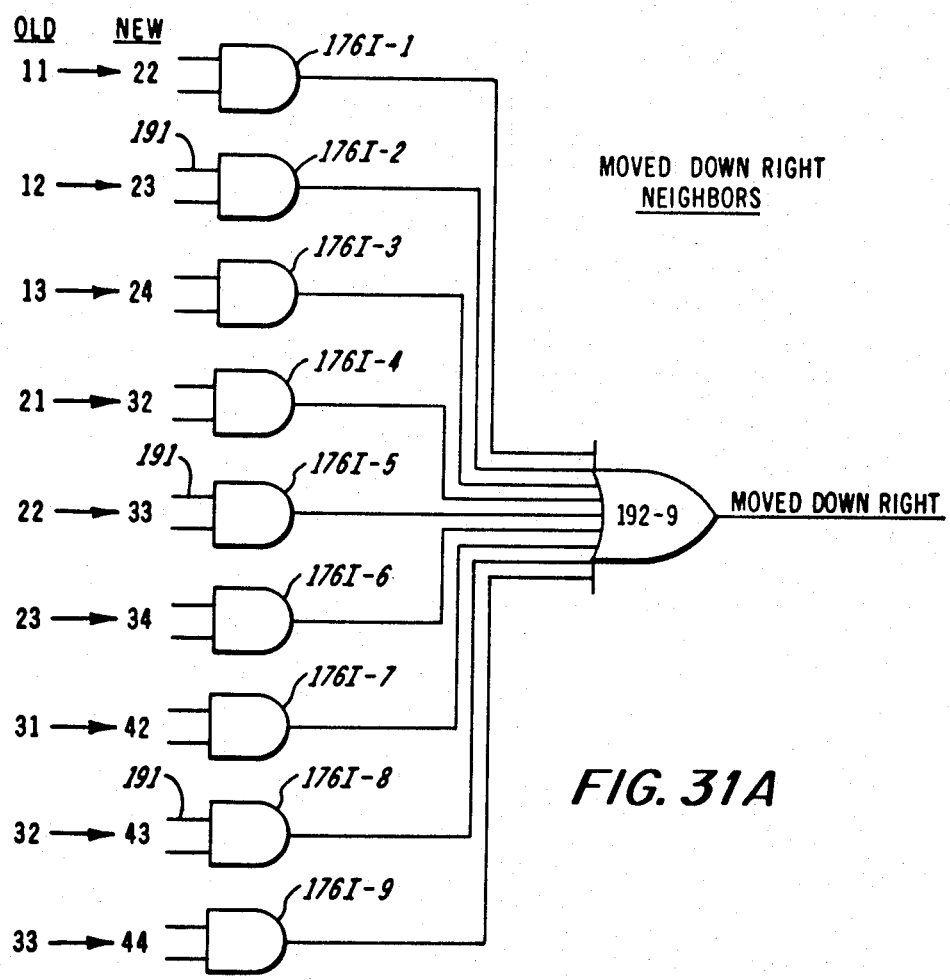
FIG. 31A is an example of part of the circuitry in FIG. 30, the example being relative to detecting for a positional function, MOVED DOWN RIGHT.
Figure 31B:
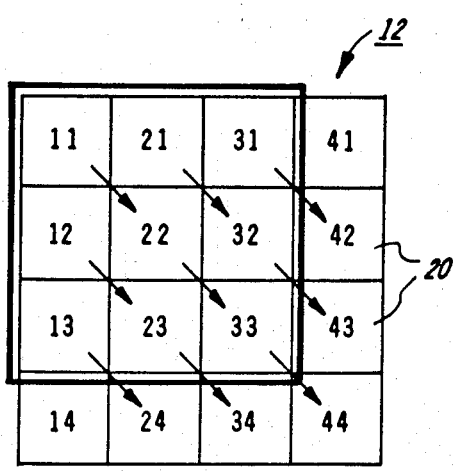
FIG. 31B is an example of operation of the circuitry in FIG. 31A relative to a cell array in detecting the positional function, MOVED DOWN RIGHT.

An example of AO gate operation and particular positional function between neighboring cells is shown in FIGS. 31A and 31B for MOVED DOWN RIGHT NEIGHBORS in the cell array. In FIG. 31A each of the nine AND gates 176I-1 to 176I-9 represent the results of pairs of inputs from diagonally positioned "down right" array cells represented by the numeral identification in FIG. 31B. The cells are numbered 11, 12, 13, 14, 21, 22, 23, 24, 31, 32, 33, 34, 41, 42, 43 and 44. The possible MOVED DOWN RIGHT pixel changes would be from cell 11 to cell 22; 12 to 23; 13 to 24; 21 to 32; 22 to 33; 23 to 34; 22 to 33; 31 to 42; 32 to 43 and 33 to 44.

If there is no pixel "1" present in "old" cell positions or in the "new" pixel positions, all inputs to the AND gates 176I would be low or "0" and their outputs would all low or "0". As a result, the output at OR gate 192-9 would be low or "0". Assume that the OLD SPOT input to AND gate 176I-3 is a high or "1", a pixel "1" having been detected in cell position 13. Assume further that on the next cycle, the pixel "1" is identified as PIXEL LIGHT in cell 24. Both inputs to this gate will be high or "1". The output of AND gate 176I-3 will, therefore, be a high or "1" and the output at OR gate 192-9 would be a high or "1", indicative of MOVED DOWN RIGHT of a pixel "1" from cell 13 to cell 24.

Figure 32:
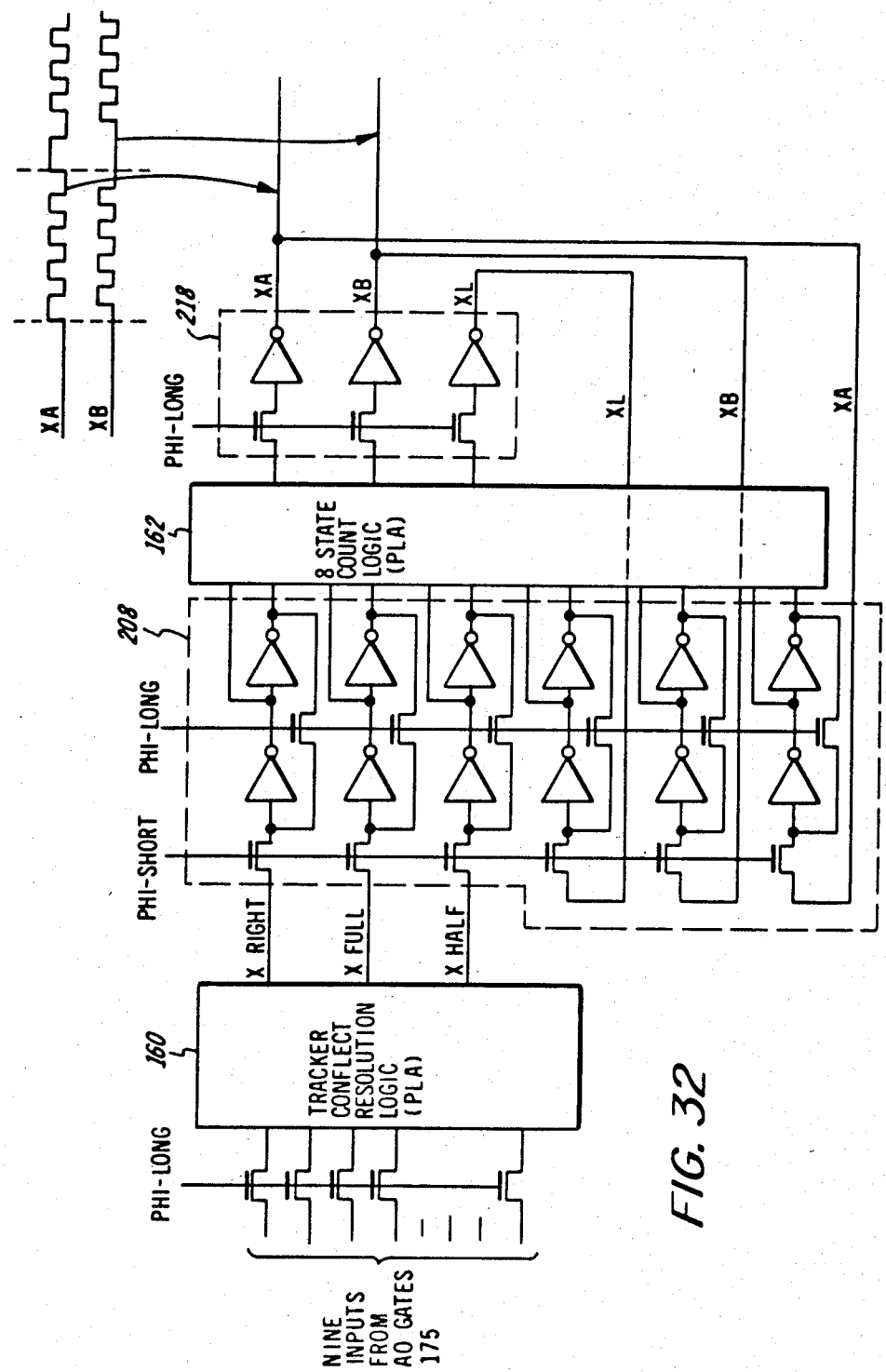
FIG. 32 is a more detailed logic diagram of the tracker PLA and counter of FIG. 27 for X tracking movements, the logic circuitry being identical for Y tracking movements.
Figure 33A:
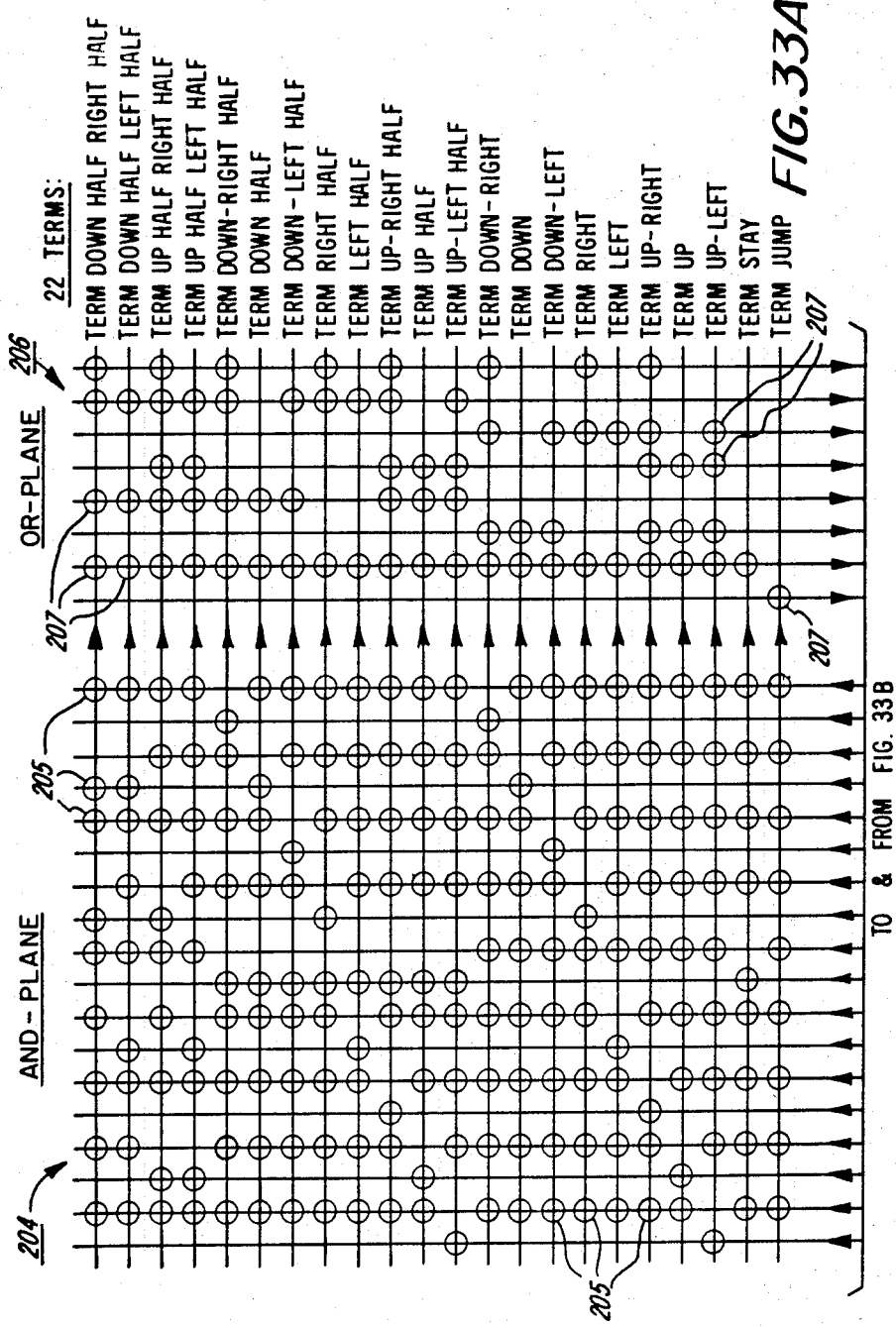
FIGS. 33A and 33B are a symbolic logic representation of the conflict resolution circuitry of the tracker (PLA) in FIG. 32.
Figure 33B:
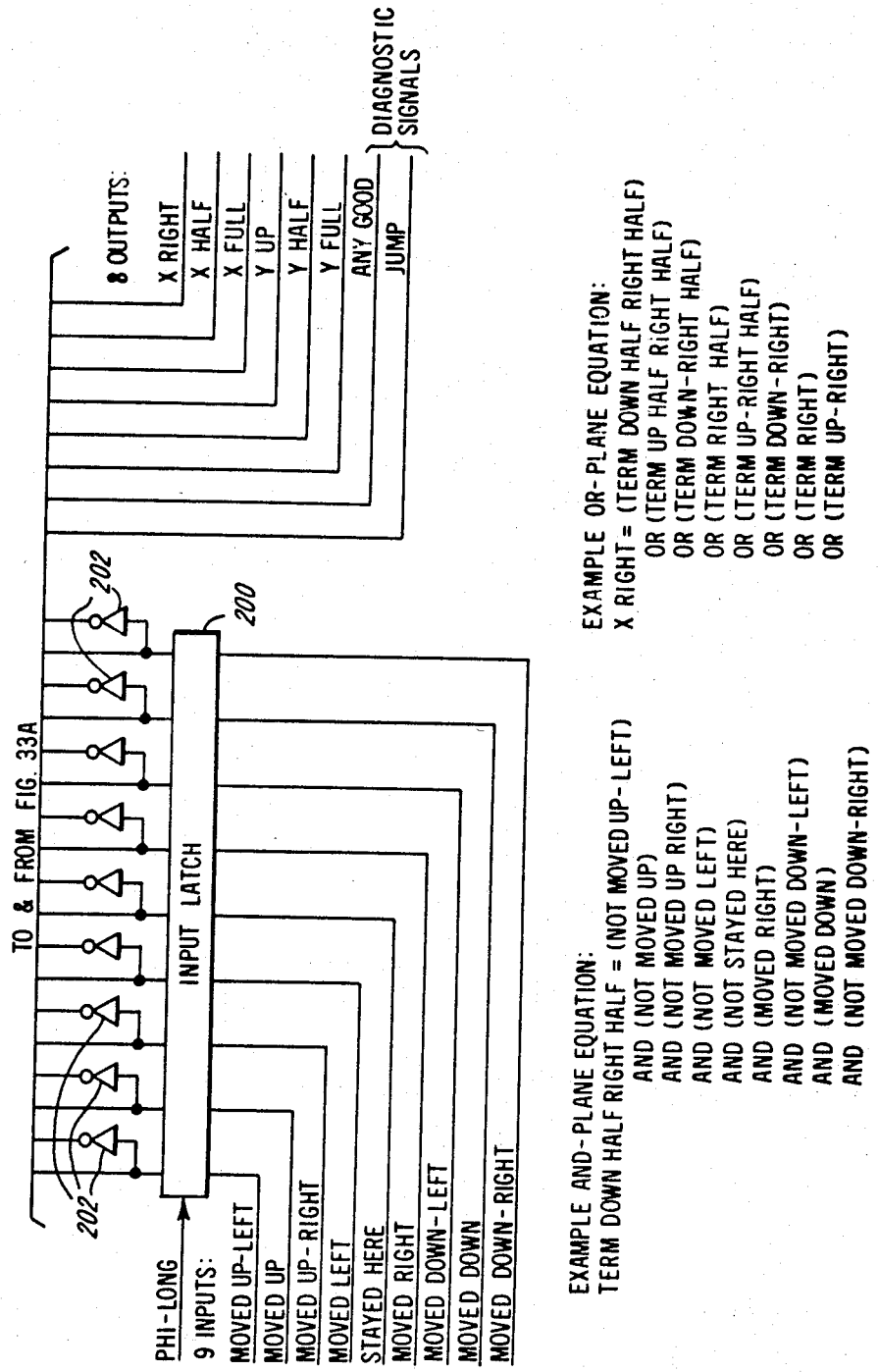

The outputs of the nine AO gates 175 are the nine inputs to the tracker 160 shown in FIG. 32. The tracker 160 is a PLA of conventionally implemented logic design for implementing combinational logic functions using AND, OR and INVERT logic. For a detail discussion of programmable logic array design, see the book, "Introduction to VLSI Systems", supra, Chapter 3, pages 79–82. The logic representation for tracker 160 is shown in FIGS. 33A and B. This is a symbolic representation of the tracker conflict resolution and comprises an input latch 200, the "NOT" inverters 202, AND plane 204 and OR plane 206. Each of the circles 205 along the horizontal lines in the AND plane 204 represent inputs to AND gates in the AND plane. The functioning of each circle is AND gate transistor and the resultant horizontal output is productive of the 22 terms listed to the left of the OR plane 206. The circles 207 in the OR plane 206 indicate the eight outputs produced upon vertical ORing of the horizontal AND gates results. Thus, the logic function and equation can be readily determined by inspection of the AND and OR planes in FIG. 33A. An example is given at the bottom of FIG. 33B relative to TERM DOWN HALF RIGHT HALF.

In the AND plane 204 for TERM DOWN HALF RIGHT HALF, the gate inputs for term to be responsive would equal to inverted AND inputs of NOT MOVED UP-LEFT, NOT MOVED UP, NOT MOVED UP RIGHT, NOT MOVED LEFT, NOT STAYED HERE, NOT MOVED DOWN LEFT and NOT MOVED DOWN RIGHT plus the AND of MOVED RIGHT and MOVED DOWN. Thus, one pixel in an image has moved down and another pixel has moved right, indicative of a half step DOWN RIGHT, as previously exemplified in FIG. 26.

In the OR plane 206, the ORing for X RIGHT are OR gates 207 for all terms involving an X right movement, which number eight terms. For the example at hand, the output X RIGHT for tracker 160 would be TERM DOWN HALF RIGHT HALF.

In FIG. 32, only the X counter 162 is shown for simplicity. The outputs X RIGHT, X HALF and X FULL from the tracker 160 and OR plane 206 are fed to a conventional latch 208 which is a quasi-static input register for X counter 162.

Figure 34A:
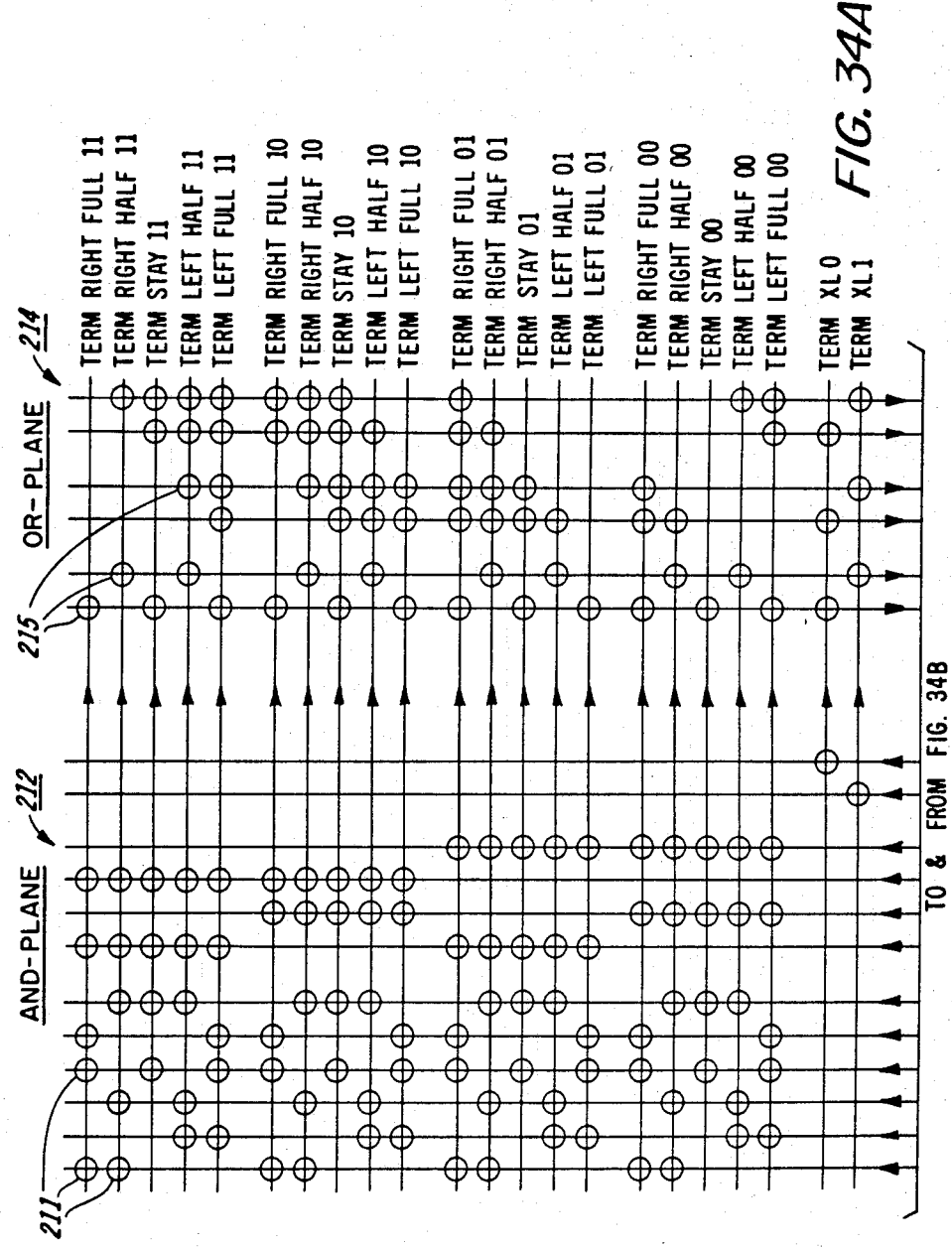
FIGS. 34A and 34B are a symbolic logic representation of the circuitry of the X counter (PLA) in FIG. 32.

The symbolic logic representation for the eight state counter 162 is shown in FIGS. 34A and B. The logic employed for the Y counter 164 is, of course, the same.

The three inputs, X RIGHT, X HALF and X FULL are clocked by PHI-SHORT through the input latch 208 to the inverters 210 and to the AND plane 212. Each of the circles 211 at each horizontal line of the AND plane represents an input to an AND gate, so that each circle can be characterized as an AND gate transistor. The terms for these gates are listed along each horizontal line to the right of the OR plane 214 with the listing of the binary value BA for each term.

Each horizontal line or AND gate is coupled to one or more OR gates 215 in the OR plane 214. Pairs of these OR gate outputs are inputs to the AND gates 216. The AND gate outputs are then clocked by PHI-LONG through output latch 218. The outputs of latch 218 are quadrature signals XA, XB and XL. Signals XA and XB are the quadrature signals monitored by the user system 18. All three of these signals are fed back to input latch 208 as state feedback to the AND plane 212 and, along with tracker inputs, are productive of the terms identified in FIG. 34A.

Figure 34B:
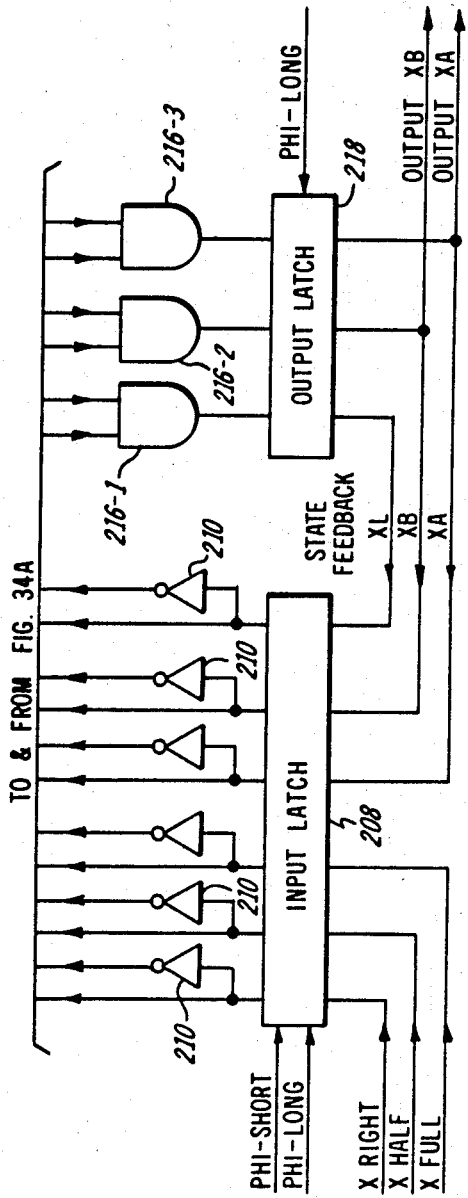

Example AND plane and OR plane functions and equations are given at the bottom of FIG. 34B. In the AND plane 212, TERM RIGHT FULL (11) is the AND of X RIGHT, NOT X HALF, X FULL, XA and XB.

In the OR plane 214, the result for XL produced by gate 216-1 would be the ORing of all values of XX, i.e., the OR of TERM XL 1, TERM RIGHT HALF XX, and TERM LEFT HALF XX ANDed with the OR of TERM XL 0, TERM RIGHT FULL XX, TERM STAY XX, and TERM LEFT FULL XX.

The outputs XA and XB are the quadrature signals to the user system 18. These four output signals XA, XB, YA and YB provide quadrature encoding indicative of movement in a X-Y coordinate system. The phase relationship of the signals in either the X or Y direction is indicative of the direction of movement. Each of these signals is a square pulse wave. Relative to the coordinate directions identified in FIG. 28, if the pulse train XA is leading in time the pulse train XB, then this means a move LEFT. If XB is leading XA, this means a move RIGHT. By the same token, if the pulse train YA is leading in time the pulse train YB, this means a move DOWN. If YB is leading YA, this means a move UP.

Figure 35:
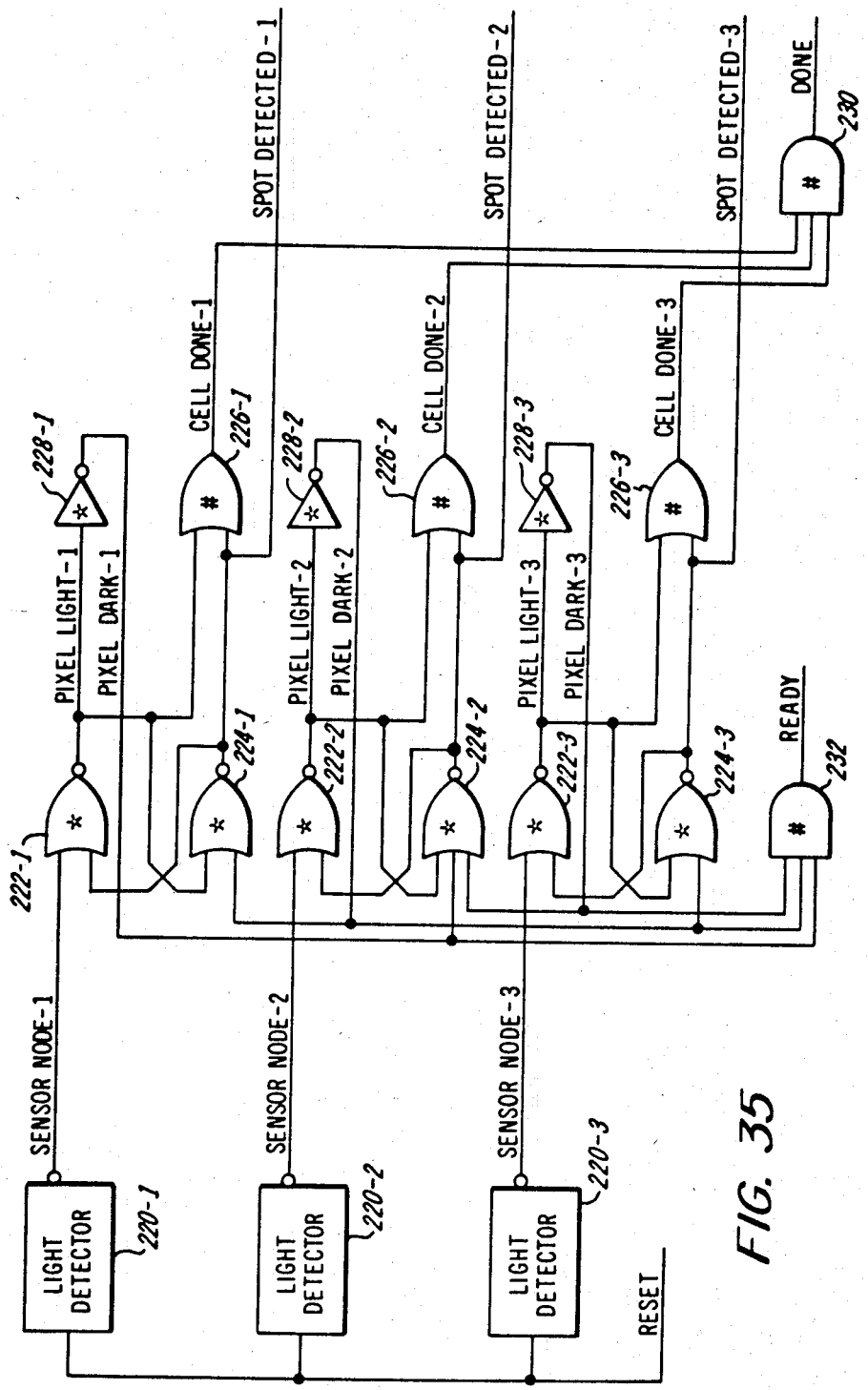
FIG. 35 is a logic diagram for a linear detection scheme similar to FIG. 20 except utilizing a contrasting pattern comprising dark features on light background.

Up to this point, the contrasting pattern 22 under discussion has been one of light features, e.g., spots, on a dark background. FIG. 35 is a representation of the circuitry for an imager 14 for sensing dark features on light background. In previous cases, for light spot detection in a contrasting pattern 22, the cells "race" to see which will be first within its inhibition neighborhood to detect enough light and inhibit the operation of other cells in the neighborhood. The approach of the imager in FIG. 35 is to see which of the cells can be last to obtain enough light. Those cells reporting out a high or "1" for SPOT DETECTED have detected a spot.

In FIG. 35, the output, SENSOR NODE, of the light cells 220 are coupled to low threshold NOR gates 222. NOR gates 222 and 224 form pairs for each cell 220. The outputs of NOR gates 222 are PIXEL LIGHT and are cross coupled to NOR gates 224 of the pair and is also an input to a respective OR gate 226 and to a respective low threshold inverter 228. The output of NOR gate 224 of each NOR gate pair is cross coupled as the other input to the NOR gate 222 and the other input to the respective OR gate 226. The output of OR gates 226 is CELL DONE, and are inputs to high threshold AND gate 230, the output of which is the signal DONE to timing logic 126.

The output of the inverters 228 is the complement of PIXEL LIGHT, i.e., PIXEL DARK. All outputs, PIXEL DARK, are connected as inputs to high threshold AND gate 232, the output of which represents the signal, READY. Also, the output, PIXEL DARK-1 is an input to NOR gate 224-2, while PIXEL DARK-2 is an input to both NOR gates 224-1 and 224-3 and PIXEL DARK-3 is an input to NOR gate 224-2. NOR gate 224-2 therefore has two connected neighbors. Stable images are the outputs SPOT DETECTED.

Operation of the imager of FIG. 35 is as follows. The starting states are RESET of cells with the state of SENSOR NODE high or "1", PIXEL LIGHT will be low or "0", PIXEL DARK will be at "1", SPOT DETECTED at "0" and CELL DONE at 37 0". SENSOR NODE will slowly go from "1" to "0" as a particular cell 220 receives light, in this case being light from the light received from the background between the dark features of a contrasting background.

Assume that SENSOR NODE-2 senses light. As a result, PIXEL LIGHT-2 will go high or "1" (both inputs to NOR gate 222-2 would be low) and PIXEL DARK-2 would be low or "0". Assume SENSOR NODE-1 remains high because it is over a dark feature. Thus, the inputs, PIXEL LIGHT-1 and PIXEL DARK-2, to NOR gate 224-1 will be both low or "0". As a result, the SPOT DETECTED-1 output of NOR gate 224-1 will go high or "1", indicating that it has "detected" a feature and pixel for cell 220-1. OR gate 226-1 (CELL DONE-1) will go high or "1" as an input to AND gate 230. CELL DONE-2 will also go high or "1" since PIXEL LIGHT-2 is high or "1". By the same token, cell 220-3 will report its CELL DONE-3 high or "1", after having either sensed light or detected a feature as just explained, respectively, relative to cells 220-1 and 220-2.

Note that when all cells have received light, it is possible for the cell array to arrive at a stable state in which no features were detected, i.e., all SPOT DETECTED are at "0" and all PIXEL LIGHT outputs are at "1". Therefore, in the case of FIG. 35 comprising 3 pixel neighbor inhibiting dark spot sensors, five stable images are possible: two stable "complete" images 101 and 010 and three stable "subset" images, 100, 001 and 000. By "subset", it is meant that the images 100 and 001 are species of the image 101 while image 000 is a species of image 010.

In FIG. 36, the additional "subset" images are illustrated for a four by four dark spot detector arrays having the designated inhibition radius. The number of additional "subset" images for each inhibition case is given. These images are in addition to the "complete" images possible for the same inhibition radius identified in FIG. 12. For example, in the case of inhibition radius 3.0, the number of possible images is the 30 "complete" images identified in FIG. 12 plus the additional 13 "subset" images in FIG. 36, for a total of 43 images.

An advantage of this tracking scheme is that the feature pattern of dark features on a light background need not be so closely matched to the inhibition pattern selected, since the circuit logic is willing to "wait" for features to really be present before a cell "claims" to have seen one. Thus, a pseudo-random distribution of dark features, such as black dots, would be of sufficient uniformity for tracking purposes.

While the invention has been described in conjunction with specific embodiments, it is evident that many alternatives, modifications and variations will be apparent to those skilled in the art in light of the foregoing description. Accordingly, it is intended to embrace all such alternatives, modifications, and variations as fall within the spirit and scope of the appended claims.

What is claimed is:

1. An imaging array comprising a planar array of optical sensor cells each capable of sensing and converting optical radiation into an electrical output signal when any one of said cells has sensed a predetermined quantity of radiation, a field of contrasting features detectable by said sensor array, the difference in the spatial frequency of said contrasting features in said field relative to the spatial relation of said cells productive of an intermediary pattern comprising at least one detected contrasting feature from said field, circuit means coupled to each of said cells to receive said output signals with the output signals of each of said cells coupled with several of said neighboring cells in said array to alter the output of said neighboring cells resulting in the recognition of said intermediary pattern as being one of a limited plurality of predetermined such patterns.

2. The imaging array of claim 1 wherein the electrical correspondence among said cells is such that at least one of said cells in the array has sensed said predetermined quantity of radiation from said field to produce said output signal and the remainder of the cells in the array either having not sensed said predetermined quantity of radiation from said field to produce said output signal or have been electrically inhibited by a neighboring cell from reporting any sensitization from said field due to receipt of an output signal from said neighboring cell.

3. The imaging array of claim 1 wherein the electrical correspondence among said cells is such that at least one of said cells in the array has not sensed said predetermined quantity of radiation from said field and produce an indication thereof and the remainder of the cells in the array having sensed said predetermined quantity of radiation from said field to enable said nonsensing cells to produce said output signal due to said indication received from said sensing cells.

4. The imaging array of any of the claims 1, 2 and 3 wherein said planar array comprises a linear array of cells.

5. The imaging array of any one of the claims 1, 2 and 3 wherein said sensor cells and circuit means are integrally formed in an integrated circuit chip.

6. The imaging array of any one of the claims 1, 2 and 3 wherein said optically detectable pattern comprises a multitude of uniform spaced features on a contrasting background, means to focus said field onto said sensor array.

7. A imaging array including a field of optically detectable features, said array comprising a planar array of optical sensor cells and capable of recognizing a plurality of distinguishable bitmap images upon relative translation between said array and said field, circuit means coupled to each of said cells to provide a plurality of cell outputs each capable of representing whether a cell has sensed a predetermined quantity of radiation received from said field and providing a corresponding output signal the output signal of each of said cells coupled to at least one neighborhood cell to inhibit the operation of said at least one neighboring cell when said inhibiting cell has sensed said predetermined quantity of radiation, the neighborhood cell inhibition productive of a limited number of said distinguishable bitmap images recognizable from said field.

8. The imaging array of claim 2 wherein said array comprises a two dimensional array of cells.

9. The imaging array of claim 7 wherein said sensor cells and said circuit means are integrally formed in an integrated circuit chip.

10. The imaging array of claim 7 wherein said field comprises a multitude of spatial features on a contrasting background, means to focus said field onto said array.

11. The imaging array of claim 10 wherein said field of spatial features is illuminated from the front surface thereof.

12. The imaging array of claim 10 wherein said field of spatial features is transmissive of illumination through said field.

13. The imaging array of claim 10 wherein said field comprises a plurality of spaced light features on a dark background.

14. The imaging array of claim 10 wherein the spacing between said features is greater than the extent of inhibition across said array but less than the extent of said array.

15. The imaging array of claim 10 wherein said field comprises a plurality of spaced dark features on a light background.

16. The imaging array of any one of the claims 10 to 15 wherein said field comprises uniformly spaced features.

17. The imaging array of any one of the claims 10 to 15 wherein said features consist of spots.

18. The imaging array of claim 7 wherein the extent of said neighborhood cell inhibition is over a substantial portion of said array.

19. An imaging array comprising a plurality of sensor cells capable of sensing and converting optical radiation into an electrical signal, means for presenting a field of features to said array for sensitizing selected ones of said cells based upon the spatial frequency of contrasting features in said field relative to the spatial relation of said array cells so as to be productive of an intermediary pattern comprising at least one contrasting feature from said field detectable by said array, circuit means coupled to said cells, the electrical corrspondence among said cells via said circuit means to inhibit the sensing operation of cells in the array that are in proximity to a cell that has sensed a predetermined quantity of radiation productive of said electrical signal, said inhibition extended over a predetermined extent of the array whereby at least one of said cells in the array has sensed radiation and remaining cells in the array have either not sensed radiation or have been inhibited from sensing radiation, said at least one of said cells thereby producing recognizable bitmap images within the metes and bounds of the array.

20. The imaging array of claim 19 wherein said sensor array comprises a two dimensional array of cells.

21. The imaging array of claim 19 wherein said sensor cells and circuit means are integrally formed in an integrated circuit chip.

22. The imaging array of claim 19 wherein said field comprises a multitude of spatial features on a contrasting background, means to focus said field onto said array.

23. The imaging array of claim 22 wherein said field of spatial features is illuminated from the front surface thereof.

24. The imaging array of claim 22 wherein illumination is transmissive through said field of spatial features.

25. The imaging array of claim 22 wherein said field comprises a plurality of spaced light features on a dark background.

26. The imaging array of claim 22 wherein the spacing between said features is greater than the extent of inhibition across said array but less than the extent of said array.

27. The imaging array of claim 22 wherein said field comprises a plurality of spaced dark features on a light background.

28. The imaging array of any one of the claims 22 to 27 wherein said field comprises uniformly spaced features.

29. The imaging array of any one of the claims 22 to 27 wherein said features consist of spots.

30. The imaging array of claim 19 wherein the extent of inhibition is over a substantial portion of said array.

31. The imaging array of claim 1 wherein each of said cells comprises a dynamic node, reset means coupled to said dynamic node and capable of charging said dynamic node to a voltage representing a first logic state, photosensitive means coupled to said dynamic node and capable of discharging said dynamic node to a voltage representing a second logic stage, said circuit means includes logic means coupled to said dynamic node to provide said output signal when said dynamic node is at said second state, said output signal coupled to the same logic means of at least one neighborhood cell in said array.

32. In the imaging array of claim 31 wherein said logic means includes an inverter coupled to said dynamic node to provide said output.

33. In the imaging array of claim 31 wherein said logic means includes cross coupled NOR gates, an input of one NOR gate coupled to the output of one sensor cell and at least one other input to said one NOR gate coupled to the output of the other NOR gate, another input to said other NOR gate coupled to the output of at least one other sensor cell.

34. In the imaging array of claim 31 wherein said logic means includes pairs of cross coupled NOR gates, an input of one NOR gate coupled to the output of one sensor cell and at least one other input to said one NOR gate coupled to the output of the other NOR gate of each pair, the output of said one NOR gate coupled to an inverter, the output of said inverter coupled as an input to at least one of said other NOR gates in another of said cross coupled NOR gate pairs.

35. The imaging array of any one of the claims 1, 2 and 3 wherein said planar array comprises a two dimensional array of cells.

36. The imaging array of claim 7 wherein said array comprises a linear array of cells.

37. The imaging array of claim 7 wherein each of said sensor cells includes threshold means comprising a dynamic node coupled to photosensitive means which is coupled to a reference voltage, reset means coupled to said dynamic node and capable of charging said dynamic node to a voltage representative of a first logic state, said photosensitive means discharging said dynamic node to a voltage representing a second logic state upon receipt of said predetermined quantity of radiation from said field, said circuit means including logic means coupled to said threshold means to produce said output signal when said dynamic node reaches said second logic state, said output coupled to the same logic means of at least one neighborhood cell in said array.

38. In the imaging array of claim 37 wherein said logic means includes an inverter coupled to said dynamic node to provide said output.

39. In the imaging array of claim 37 wherein said logic means includes cross coupled NOR gates, an input of one NOR gate coupled to the output of one sensor cell and at least one other input to said one NOR gate coupled to the output of the other NOR gate, another input to said other NOR gate coupled to the output of at least one other sensor cell.

40. In the imaging array of claim 37 wherein said logic means includes pairs of cross coupled NOR gates, an input of one NOR gate coupled to the output of one sensor cell and at least one other input to said one NOR gate coupled to the output of the other NOR gate of each pair, the output of said one NOR gate coupled to an inverter, the output of said inverter coupled as an input to at least one of said other NOR gates in another of said cross coupled NOR gate pairs.

41. The imaging array of any one of the claims 10 to 15 wherein said field comprises nonuniformly spaced features.

42. The imaging array of claim 19 wherein said array comprises a linear array of cells.

43. The imaging array of any one of the claims 22 to 27 wherein said field comprises nonuniformly spaced features.

44. An imaging array comprising a planar array of optical sensor cells each capable of sensing and converting optical radiation into an electrical signal, means for presenting a field of contrasting features to said array for sensitizing selected ones of said cells based upon the spatial frequency of contrasting features in said field relative to the spatial relation of said cells so as to be productive of an intermediary pattern detectable by said array, and circuit means coupled to said cells to provide a plurality of cell outputs each capable of representing whether a cell has sensed a predetermined quantity of radiation received from said field and providing a corresponding output signal, the output signal from each of said cells coupled across to at least one neighborhood cell whereby the electrical correspondence due to said output signal cross coupling results in said intermediary pattern being recognized as one of a limited plurality of predetermined bitmap images.

45. The imaging array of claim 44 wherein each of said recognized and predetermined bitmap images is representative of an occurrence of a particular event based upon an instantaneous intermediary pattern developed from said field.

46. The imaging array of claim 44 wherein the electrical correspondence among said cells in said array is such that at least one of said cells has sensed said predetermined quantity of radiation from said field to produce said output signal and the remainder of said cells either having not sensed said predetermined quantity of radiation from said field or have been electrically inhibited by a neighboring cell via said output signal from reporting any sensitization from said field due to said electrical correspondence.

47. The imaging array of claim 44 wherein the electrical correspondence among said cells in said array is such that at least one of said cells has not sensed said predetermined quantity of radiation from said field and the remainder of said cells have sensed said predetermined quantity of radiation from said field and have indicated such to enable said nonsensing cells to produce said output signal due to said electrical correspondence.

48. In an imaging array, a plurality of sensor cells, each cell comprising a dynamic node, reset means coupled to said dynamic node and capable of charging said dynamic node to a voltage representing a first logic state, photosensitive means coupled to said dynamic node and discharging said dynamic node to a voltage representing a second logic state upon receipt of a predetermined quantity of radiation, logic means coupled to said dynamic node to produce an output when said dynamic node reaches said second logic state, the output of said logic means being connected to the input of the same logic means of at least one other of said cells in said array to alter the response of said other cells upon receipt of said output.

49. In the imaging array of claim 48 wherein said logic means comprises cross coupled NOR gates, an input of one NOR gate coupled to the output of one sensor cell and at least one other input to said one NOR gate coupled to the output of the other NOR gate, another input to said other NOR gate coupled to the output of at least one other sensor cell.

50. In the imaging array of claim 48 wherein said logic means comprises pairs of cross coupled NOR gates, an input of one NOR gate coupled to the output of one sensor cell and at least one other input to said one NOR gate coupled to the output of the other NOR gate of each pair, the output of said one NOR gate coupled to an inverter, the output of said inverter coupled as an input to at least one of said other NOR gates in another of said cross coupled NOR gate pairs.

51. The method of producing distinguishable bitmaps with an array of sensor cells comprising the steps
providing an illuminated pattern comprising a field of features on a contrasting background,
moving the sensor cell array relative to the illuminated pattern,
permitting each cell to sense the presence of radiation reflected from the array pattern whereby some of said cells are responsive and some are nonresponsive,
inhibiting the continuance of the response of cells in proximity of another neighboring cell that senses a sufficient amount of radiation from the array pattern, and
reporting out from each cell as to whether the cell has been either responsive or nonresponsive or inhibited whereby a distinguishable bitmap is produced comprising responsive cells in a field of nonresponsive and inhibited cells.

52. The method of claim 51 which includes the steps of extending the operation of inhibition of neighboring cells over a predetermined extent of the array of imaging cells.

53. The method of claim 52 which includes the step of providing spacing of the features in the pattern larger than the extent of inhibition but less than the extent of the array.

54. The method of producing distinguishable bitmaps with a planar array of sensor cells comprising the steps of providing an illuminated pattern comprising a field of features on a contrasting background, moving the sensor cell array relative to the illuminated pattern, permitting each cell to sense the presence of radiation reflected from the array pattern whereby some of said cells are responsive and some are nonresponsive, correlating the results obtained from each cell with at least one neighboring cell to alter the response state of at least one of the correlation cells if one of said correlation cells has sensed a predetermined quantity of radiation, and reporting out from each sensor cell as to whether the cell has been either responsive or nonresponsive due to said correlating thereby producing a distinguishable bitmap representation from the array.

55. The method of claim 54 wherein the step of correlating comprises the step of either inhibiting the response state of at least one neighboring cell or enabling the response state of at least one neighboring cell.

56. The method of claim 54 which includes the step of interpreting each distinguishable bitmap representation to be indicative that an optically sensed event has occurred.

57. In the imaging array of claim 48 wherein said logic means produces an output when said dynamic node reaches said second state and no other input to said logic mens from at least one other of said cells has reached said second logic state to produce a corresponding output.

58. In an imaging array, a planar array of optical sensor cells each capable of sensing and converting optical radiation into an electrical signal in response to a field of repetitive contrasting features, the spatial relation of said features and said cells productive of detectable patterns by said cells upon relative positional movement between said field and said array, and circuit means coupled to said cells to provide a plurality of cell outputs each capable of representing whether a cell has sensed a predetermined quantity of radiation received from said field and providing a corresponding output signal the output signal of some of said cells coupled to at least one neighborhood cell in a manner to provide electrical correlation among said cells capable of altering the output of some of said cells whereby said field is recognized as one of limited plurality of predetermined bitmap images.

59. In the imaging array of claim 58 wherein said electrical correlation among said cells is such that at least one of said array has sensed said predetermined quantity of radiation from said field and the remainder of said cells either have not sensed said predetermined quantity of radiation from said field or have been inhibited by a neighboring cell from reporting sensitization from said field due to said correlation whereby said sensing cells are productive of a first state output signal and said remainder cells are productive of a second state output signal, the totality of said output signals forming one of said bitmap images.

60. In the imaging array of claim 58 wherein said electrical correlation among said cells is such that at least one of said cells has not sensed said predetermined quantity of radiation from said field and the remainder of said cells have sensed said predetermined quantity of radiation and have indicated such to said nonsensing cells due to said correlation whereby said nonsensing cells are productive of a first state output signal and said remainder cells are productive of a second state output signal, the totality of said output signals forming one of said bitmap images.

61. In the imaging array of claim 58 wherein said electrical correlation among said cells is such that at least one of said cells in said array has sensed said predetermined quantity of radiation from said field productive of said output signal and the remainder of said cells have not sensed said predetermined quantity of radiation from said field or have been inhibited by a sensing cell output signal from reporting sensitization from said field.

62. In the imaging array of claim 58 wherein said electrical correlation among said cells is such that at least one of said cells has not sensed said predetermined quantity of radiation from said field and the remainder of said cells have sensed said predetermined quantity of radiation and have indicated such to said nonsensing cell, said indication enabling an output signal from said nonsensing cell.

63. In the imaging array of any one of the claims 58 through 62 wherein the extent of said correlation among said cells is determined by how many output signals from neighborhood cells are coupled to each cell representing the neighborhood, said extent governing the types and numbers of said bitmap images that are recognized by said circuit means.

* * * * *

UNITED STATES PATENT AND TRADEMARK OFFICE
CERTIFICATE OF CORRECTION

PATENT NO. : 4,521,773
DATED : June 4, 1985
INVENTOR(S) : RICHARD F. LYON

It is certified that error appears in the above-identified patent and that said Letters Patent are hereby corrected as shown below:

Column 24, line 39, change "stage" to -- state --.

Signed and Sealed this

First Day of October 1985

[SEAL]

Attest:

DONALD J. QUIGG

*Attesting Officer*

*Commissioner of Patents and Trademarks—Designate*